(12) United States Patent
Ow et al.

(10) Patent No.: US 10,275,136 B2
(45) Date of Patent: Apr. 30, 2019

(54) SYSTEM AND METHOD FOR MANAGEMENT OF DIGITAL MEDIA

(71) Applicant: Duvon Corporation, Las Vegas, NV (US)

(72) Inventors: Benedict Ow, Las Vegas, NV (US); Andrew Platter, Las Vegas, NV (US); Dmitry Kogosov, Henderson, NV (US); Richard Stiles, Herderson, NV (US)

( * ) Notice: Subject to any disclaimer, the term of this patent is extended or adjusted under 35 U.S.C. 154(b) by 572 days.

(21) Appl. No.: 13/900,753

(22) Filed: May 23, 2013

(65) Prior Publication Data

US 2014/0195976 A1    Jul. 10, 2014

Related U.S. Application Data

(60) Provisional application No. 61/749,304, filed on Jan. 5, 2013.

(51) Int. Cl.
  *G06F 3/0482*   (2013.01)
  *G06F 3/0484*   (2013.01)
  *G06F 3/0488*   (2013.01)

(52) U.S. Cl.
  CPC ........ *G06F 3/04847* (2013.01); *G06F 3/0482* (2013.01); *G06F 3/04883* (2013.01)

(58) Field of Classification Search
  CPC . G06F 3/04847; G06F 3/0482; G06F 3/04883
  USPC ....................................................... 715/821
  See application file for complete search history.

(56) References Cited

U.S. PATENT DOCUMENTS

| | | | |
|---|---|---|---|
| 2002/0035727 A1* | 3/2002 | Numata | H04N 5/44543 725/44 |
| 2004/0143598 A1* | 7/2004 | Drucker | G06F 17/30011 |
| 2006/0010395 A1* | 1/2006 | Aaltonen | G06F 3/0482 715/779 |
| 2006/0224602 A1* | 10/2006 | Rawat et al. | 707/100 |
| 2007/0174275 A1* | 7/2007 | Kan | G06F 3/04847 |
| 2007/0260632 A1* | 11/2007 | Parsons | G06F 17/3089 |
| 2008/0147664 A1* | 6/2008 | Fujiwara | G06F 3/04892 |
| 2008/0256577 A1* | 10/2008 | Funaki | G06F 3/04815 725/44 |
| 2009/0185052 A1* | 7/2009 | Tokunaga | G11B 27/034 348/231.3 |
| 2010/0002013 A1* | 1/2010 | Kagaya | G06F 3/0231 345/619 |
| 2010/0229112 A1* | 9/2010 | Ergan | G06F 3/04895 715/764 |
| 2011/0029892 A1* | 2/2011 | Kurtz | G06Q 10/107 715/752 |
| 2011/0276396 A1* | 11/2011 | Rathod | G06F 17/30867 705/14.49 |

(Continued)

*Primary Examiner* — Amy M Levy
(74) *Attorney, Agent, or Firm* — Lightbulb IP, LLC

(57) ABSTRACT

A media management system configured provides functionality to store, organize, and share digital media. The media management system may capture media in one or more media capture sessions and organize the media according to the time at which it was created or captured. An adaptable media grouping system is included to allow desired media to be quickly and easily located through coarse and fine groupings. The media management system may also manage and share URLs. The media management system may be implemented on various hardware devices, including mobile, desktop, and other computing devices.

13 Claims, 21 Drawing Sheets

(56) References Cited

U.S. PATENT DOCUMENTS

| | | | | |
|---|---|---|---|---|
| 2012/0131482 A1* | 5/2012 | Dawson | ............... | G06F 3/0481 |
| | | | | 715/765 |
| 2013/0073970 A1* | 3/2013 | Piantino | ................ | G06Q 50/01 |
| | | | | 715/738 |
| 2013/0179506 A1* | 7/2013 | Hungerford | ............ | H04L 63/08 |
| | | | | 709/204 |
| 2014/0148209 A1* | 5/2014 | Weng | ..................... | H04W 4/06 |
| | | | | 455/518 |

\* cited by examiner

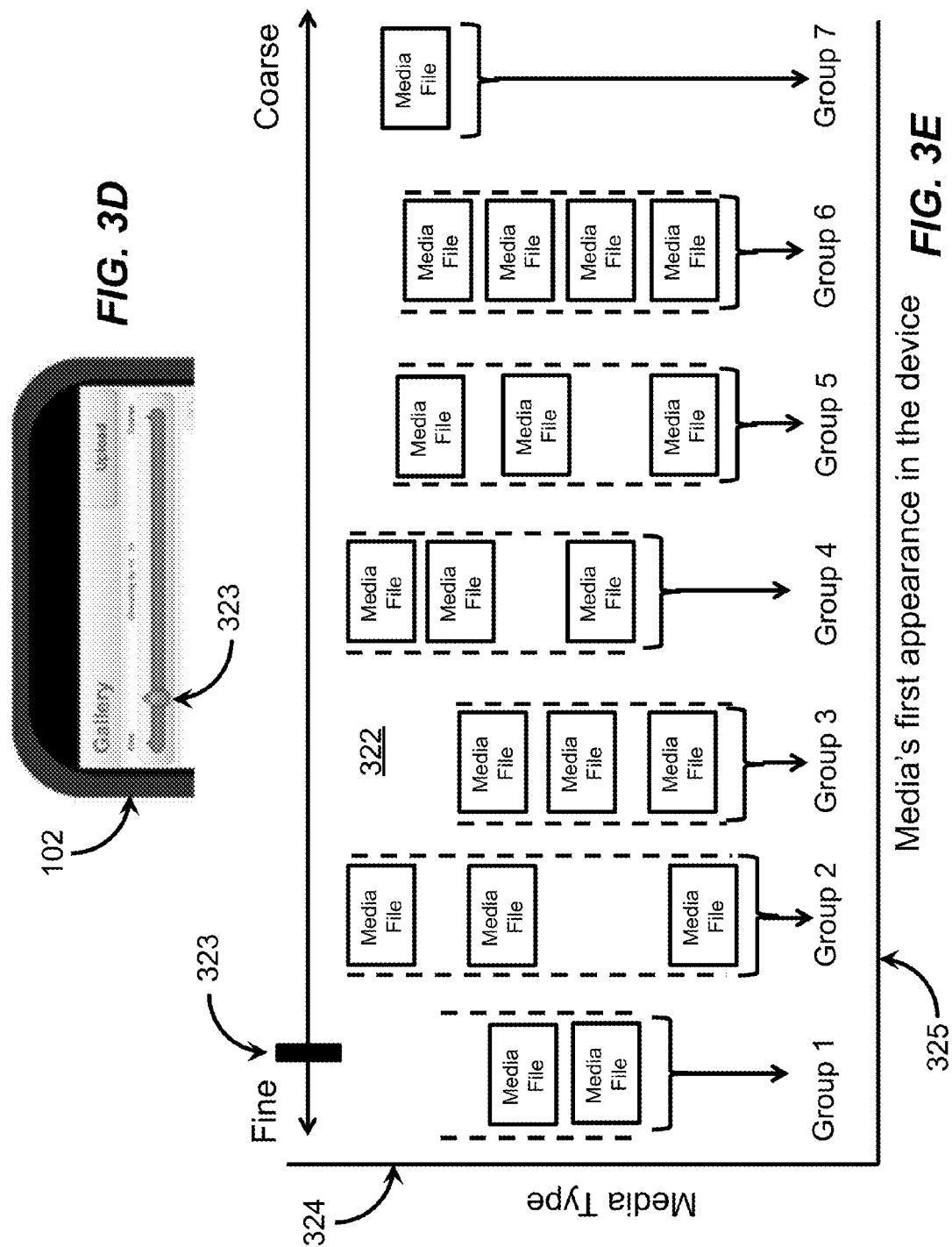

SYSTEM AND METHOD FOR MANAGEMENT OF DIGITAL MEDIA

CROSS-REFERENCE TO RELATED APPLICATION

This application claims the benefit of U.S. Provisional Patent Application No. 61/749,304, titled System and Method for Management of Captured Digital Media, filed Jan. 5, 2013.

BACKGROUND OF THE INVENTION

Field of the Invention

The invention relates to data storage and retrieval systems, and in particular to a system and method for management of captured digital media.

Related Art

The devices, features and functions described herein are intended to address shortcomings in traditional remote file storage and sharing systems, often referred to as cloud storage. There are currently a number of file sharing methods available that offer users the capability to share media (files, folders, music, movies, etc.) between devices and between users.

The invention herein provides new functionality to improve the user capabilities for sharing media, as well as introduce new ways to address other shortcomings with traditional media storage, sharing, and organization systems.

From the discussion that follows, it will become apparent that the present invention addresses the deficiencies associated with the prior art while providing numerous additional advantages and benefits not contemplated or possible with prior art constructions.

SUMMARY OF THE INVENTION

In general, the media management system disclosed herein is configured to organize, store, and share digital media, including pictures, audio, video, text and various combinations thereof in a unique fashion. As will be described herein, the media management system may include, Time Capsule, Link Locker, and Adaptive Media Grouping functionality.

In general, Time Capsule refers to a method of capturing and grouping media during an event on a mobile device, for the purpose of sharing it with one or more recipients, Link locker refers to a method of capturing, logging, storing and sharing URL links in a similar manner to the way in which you would a file or a group of files, songs, movies or other media, and Adaptive Media Grouping refers method for quickly and easily grouping multiple pieces of media into coarse and fine groupings based on various predefined characteristics of the media.

The media management system may be implemented in various ways. For example, in one embodiment, a mobile device is provided, comprising one or more capture devices configured to receive a plurality of digital media items, a sliding control configured to slide along a predefined path, and a display configured to present the digital media items to a user in the groups prior to movement of the sliding control. Each of the digital media items have one or more characteristics for use in grouping the digital media items. In addition, the groups are formed such that each of the groups contains a distinct subset of the digital media items. In other words, no two groups contain the same digital media items.

The mobile device also includes a processor configured to decrease the plurality of groups (such that there are fewer groups) in response to movement of the sliding control in a first direction along the predefined path, and to increase the plurality of groups (such that there are more groups) in response to movement of the sliding control in a second direction along the predefined path. After the plurality of groups has been increased or decreased, the processor assigns each of the digital media items to one of the groups based on the characteristics. This distributes the each of the digital media items into a group after the number of groups has been increased or decreased thereby ensuring that all digital media items are in a group even after the number of groups has been increased or decreased. The display presents each of the digital media items in the one of the groups to which it has been assigned.

It is noted that a distinct period of time is associated with each of the groups. In addition, the characteristics may consist of a creation time of the digital media items. This allows digital media items to be grouped according to their individual creation times. One or more communication devices configured to share all digital media items in a user selected one of the groups by transmitting the digital media items to a remote device may also be included in the mobile device.

A storage device configured to store the digital media items may also be included. It is noted that the digital media items may be arranged in one or more subsets according to their type in each of the groups. The digital media items may be various types of media, such as URL links, audio files, video files, text files, and image files.

In another exemplary embodiment, a media management system might comprises a plurality of digital media items, a plurality of distinct groups configured to contain one or more of the digital media items, and a sliding control configured to slide along a predefined path, wherein movement of the sliding control in a first direction indicates a user selection of a coarse media grouping and movement of the sliding control in a second direction indicates a user selection of a fine media grouping. Each of the distinct groups is associated with a distinct period of time. It is noted that the sliding control may be provided by the display (e.g., presented on the display), and the first direction may be left and the second direction may be right for the sliding control. In addition or alternatively, the predefined path of the sliding control may be a linear horizontal path.

A processor of the media management system is configured to group each of the digital media items into the distinct groups, wherein a digital media item is added to one of the groups when its creation time is within the group's associated period of time. In addition, the processor increases the plurality of distinct groups and contract the period of time associated with each of the distinct groups in response to the user selection of the fine media grouping, and decreases the plurality of distinct groups and expand the period of time associated with each of the distinct groups in response to the user selection of the coarse media grouping. Each of the digital media items is then assigned by the processor to one of the distinct groups after the plurality of distinct groups is increased or decreased.

A display of the media management system is configured to present the digital media items, wherein each of the digital media items is presented within one of the distinct groups based on the digital media item's creation time.

It is noted that the media management system may include a communication device configured to share all digital media items in a user selected one of the groups by transmitting the digital media items to a remote device. A storage device configured to store the digital media items may also be provided.

As stated above, the digital media items may be arranged in one or more subsets according to their type in each of the groups. In addition, the digital media items may be various media, including URL links, audio files, video files, text files, and image files.

Various methods of managing media are disclosed herein as well. For example, in one embodiment, a method of managing media with at a mobile device comprises capturing a plurality of digital media items with a capture device of the mobile device, storing the digital media items on a storage device, and assigning the digital media items to a plurality of distinct groups, wherein each of the distinct groups contains a distinct subset of the digital media items.

The method also includes providing a sliding control, where the sliding control configured to move along a predefined path, wherein movement of the sliding control in a first direction indicates a user selection of a coarse media grouping and movement of the sliding control in a second direction indicates a user selection of a fine media grouping.

In response to receiving the user selection of the coarse media grouping, the plurality of distinct groups is decreased such that there are fewer groups. In contrast, in response to receiving the user selection of the fine media grouping, the plurality of distinct groups is increased such that there are more groups. After increasing or decreasing the plurality of distinct groups, the digital media items may be re-assigned to the distinct groups, wherein each of the distinct groups contains a distinct subset of the digital media items. This ensures that each of the digital media items is in one of the distinct groups after the number of groups is increased or decreased.

After assigning the digital media items to the distinct groups, the digital media items may be presented in the distinct groups on a display device of the mobile device. Likewise, after re-assigning the digital media items to the distinct groups, the digital media items may be presented in the distinct groups on a display device of the mobile device. It is noted that all digital media items in a user selected one of the distinct groups may be transmitted to a remote device to share the digital media items.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 3A-3F illustrate operation of Adaptive Media Grouping in an exemplary embodiment of the media management system;

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the media management system disclosed herein is configured to organize, store, and share digital media, including pictures, audio, video, text and various combinations thereof in a unique fashion. As will be described further below, the media management system may be provided via a mobile device, such as a smartphone, tablet, PDA, portable media player, laptop computer, or other portable computing device.

The disclosure herein is separated into three specific systems and methods, namely, Time Capsule, Link Locker, and Adaptive Media Grouping. As will be described in detail further below, Time Capsule refers to a method of capturing and grouping media during an event on a mobile device, for the purpose of sharing it with one or more recipients, Link locker refers to a method of capturing, logging, storing and sharing URL links in a similar manner to the way in which you would a file or a group of files, songs, movies or other media, and Adaptive Media Grouping refers method for quickly and easily grouping multiple pieces of media into coarse and fine groupings based on various predefined characteristics of the media.

It is noted that one or more or all of the specific systems and methods may be provided as part of a single media management system. In addition, it is contemplated that, though certain functionality is disclosed herein as being activated by particular user interface elements or controls (such as buttons), various user interface elements or controls could be used to access, activate or otherwise use the media management system herein.

Time Capsule

Time Capsule includes systems and methods for creating a session on a mobile device for the purpose of sharing media, and then activating the share at the conclusion of the event that was created. In this manner, Time Capsule collects media (and information in general) during a user defined event period or session. Media collected during a session can then be shared with one or more recipients as desired.

In operation, Time Capsule will log all items that appear on the device after the timestamp for initiating the event has been created. Time Capsule will continue to log all new media and items appearing on the device until an ending timestamp is recorded on the device as an indication of that the session has ended. The user can start, stop and/or pause/resume the session at anytime. The user can also choose to add to an existing session.

Figure 1A:
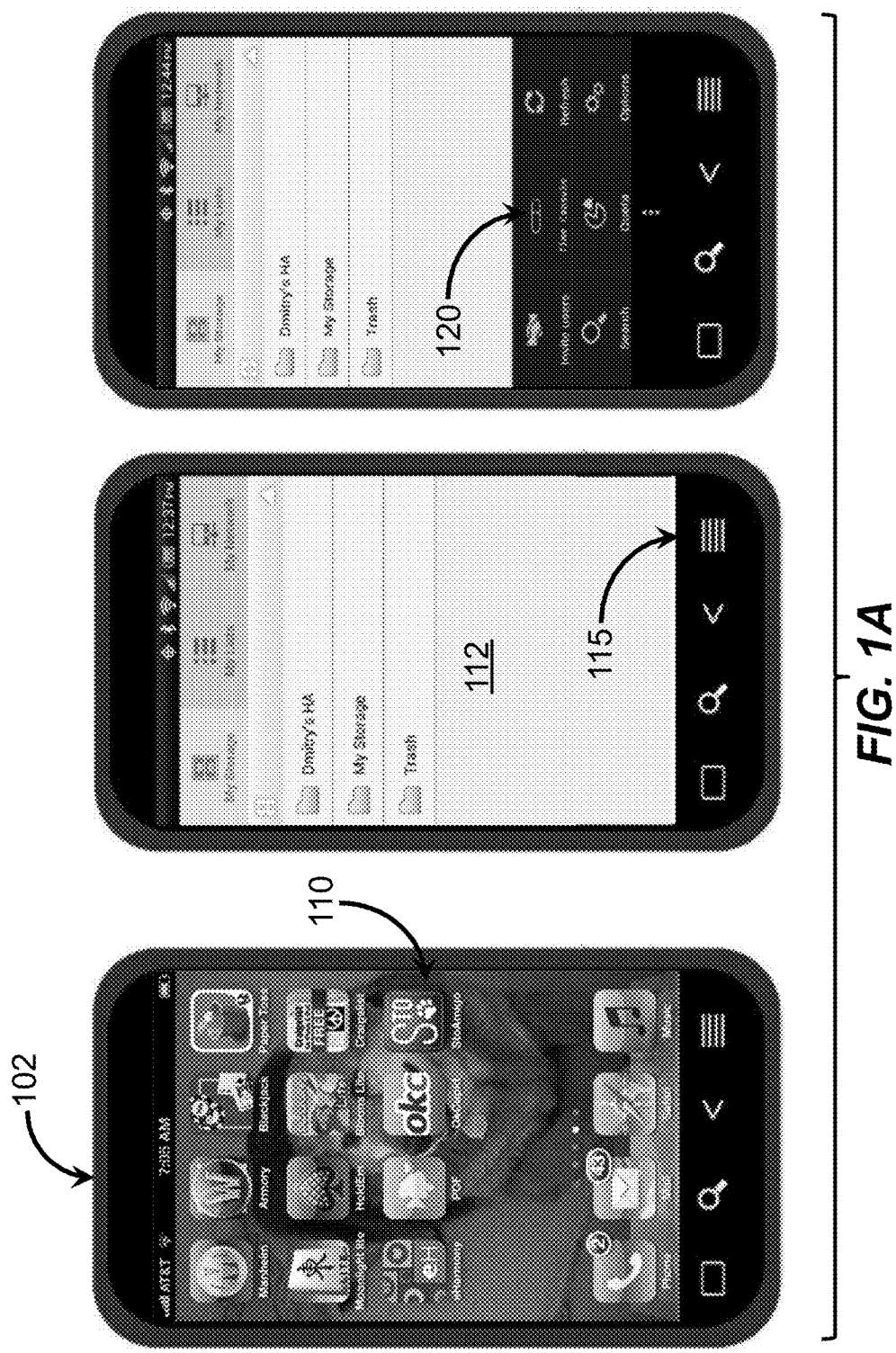
FIGS. 1A-1F illustrate operation of Time Capsule in an exemplary embodiment of the media management system.

Operation of Time Capsule will now be described with reference to FIGS. 1A-1F. As can be seen in FIG. 1A, the user of the mobile device 102, which may be a smartphone, tablet, PDA, portable media player, pad, laptop, or other portable computing device, will generate a timestamp on the mobile device 102 by activating the application software 110 on the device. An application window 112 will appear on a screen of the mobile device. This indicates that the application software is running, and that the mobile device 102 is ready to capture media. It is noted that a mobile device 102 may utilize various operating systems, now known or later developed, including iOS, Android, Windows, or the like.

Time Capsule may be activated in various ways. Typically, a user will engage one or more user interface elements, such as buttons, switches, links or the like to active Time Capsule. As shown in FIG. 1A for example, the user may activate a menu button 115 and engage a "Time Capsule" button 120 to activate Time Capsule. Once Time Capsule is activated, the user can begin to record video, take photos, notes, or introduce new media of any type to the device. As this media is being added to the device, Time Capsule will record the name, type and location of the media. It is noted that some or all the data being stored by Time Capsule may be stored locally on the mobile device 102, on a remote server, or both. Typically, captured media will be stored locally on the mobile device 102.

Figure 1B:
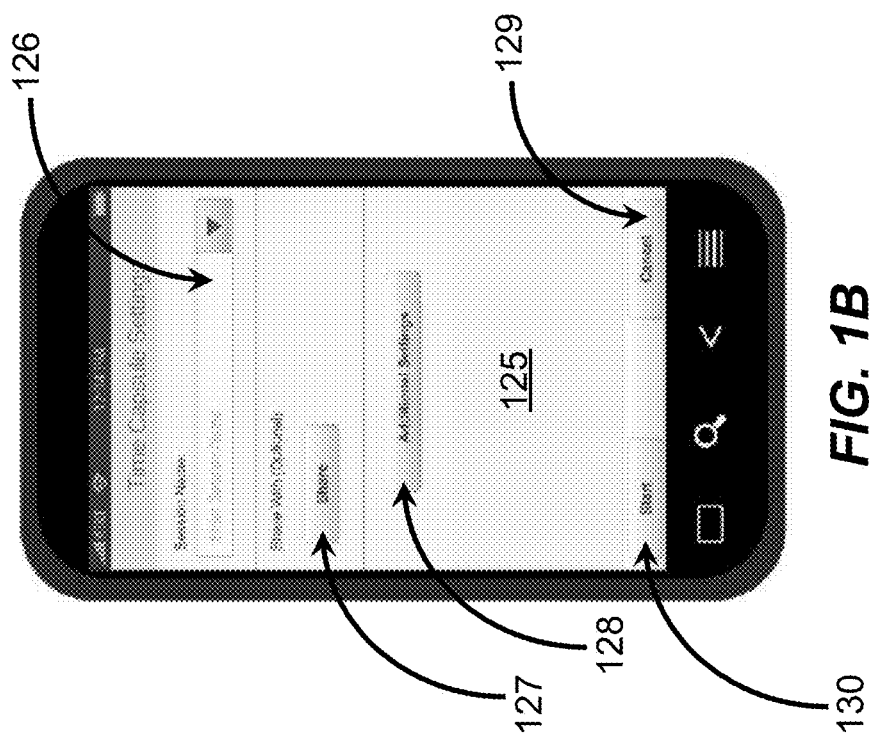

Referring to FIG. 1B, it can be seen that the software application may include a settings screen 125 configured to prompt the user for additional information, such as a session name, select users to share captured media with, or enter additional settings for the session. As shown in FIG. 1B for example, an input field 126 is provided to receive a session name from the user, while buttons 127, 128 allow a user to select users to share captured media with and to configured additional settings, respectively. A "Start" button 130 is provided to initiate the media recording session, and a "Cancel" button 129 is provided to cancel the session.

If engaged, the "Start" button 130 will initiate a media capture session. A timestamp will typically be generated when the media recording session is initiated as disclosed above. At the conclusion of the media recording session, the user can stop the Time Capsule by initiating an "End" command or button, which will generate a finishing timestamp on the device and associated the finishing timestamp with the media recording session that was ended.

The user may then be prompted to either edit the media that has been collected within the media recording session, or to share the media without the need for manually reviewing and selecting media to share or to remove from the share. If the user elects to share media, the user can select recipients from his list of contacts and then initiate the share, such as shown in FIG. 1C.

Figure 1C:
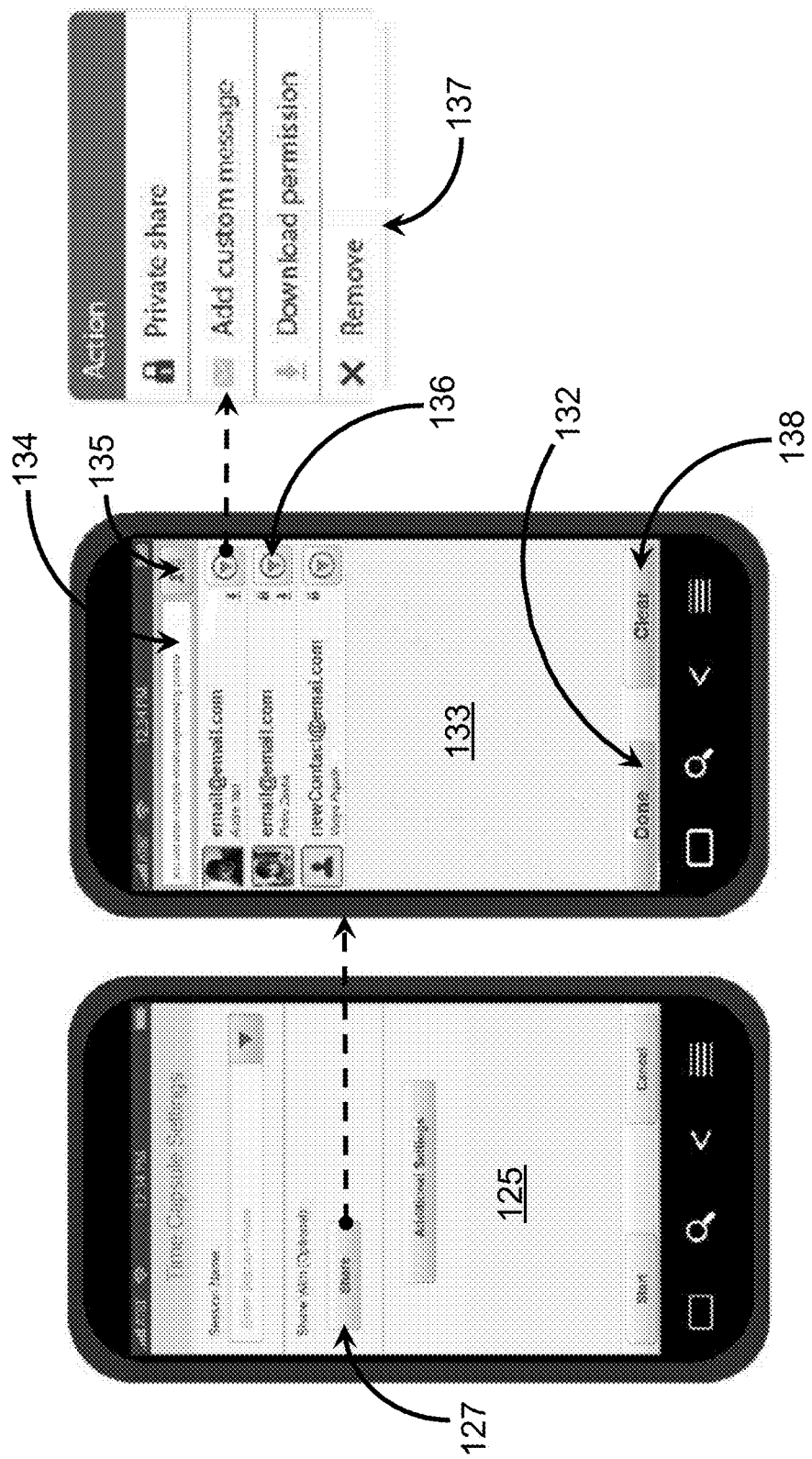

As can be seen from FIG. 1C, the software application my provide a share screen 133 with various user interface elements to allow a user to search for and select recipients, add new recipients, and set use permissions such as download and privacy permissions. For example, an input field 134 and a "Contacts" button 135 are provided to allow the user to select/identify his or her desired recipients. A "Permissions" button 136 is provided to allow the user to define use permissions. As can be seen, a use permissions control 137 may be shown to allow the user to specify particular use permissions after the "Permissions" button 136 has been engaged. A "Done" button 132 is provided to end recipient selection and begin media distribution to the selected recipients. A "Clear" button 138 may be activated to reset the current selection of recipients, if desired. The user may access the share screen 133 in various ways, including by engaging a "Share" button from the settings screen 125, such as shown in FIG. 1C.

The shared media typically will not be transferred to the recipients' devices, but will instead be hosted on a cloud or other remote data storage repository (such as a remote server as described below) where the recipients can access, review and enjoy the media, without having it take up unnecessary space on their mobile devices. The shared media will stay in place and will remain available until the owner of the share removes the media or otherwise terminates the share. The owner (e.g., the user that captured the media) can choose at any time to allow the recipients full access to the media, which would grant them download permission to the media. These media access permissions are granted and controlled by the owner of the media, and can be modified, edited or revoked at anytime by the owner.

These permissions can further be assigned either directly to the media, or the recipient. Allowing the share to be created by either media or the recipient gives the owner advanced control over the media being shared. Further, the ability to eliminate or "un-share" the media (or groups of media) is simple to initiate in this manner.

As can be seen, the permission settings on the media being shared are based on the recipient of the share, as opposed to the media itself. With this permission based sharing, the shares can be managed by the user without the need for passwords or other traditional protection methods. Permissions are always controlled by the owner of the share, and can be changed and/or revoked at any time while the share is active. This gives the media owner ultimate control over their content. Shares can be taken back at any time, regardless of the content of the share, the user the share is tied to, or the media being shared.

Further details regarding the additional settings that may be configured for a media recording session will now be described with reference to FIG. 1D. As can be seen, additional settings may be specified via an additional settings screen 139 presented by the software application. The additional settings screen 139 may be activated in various ways, including by engaging an "Additional Settings" button of the settings screen 125 as shown in FIG. 1D.

Some exemplary additional settings include what type of network connection to use to upload (for sharing purposes) media from a media recording session, or whether the media should be reviewed prior to sharing. The user may specify that any type of network connection may be used to upload media or that only particular network connections may be used. For example, selecting WiFi would prevent media upload except when the mobile device has network connectivity via a WiFi connection. If the user specifies that any available network connection be used, media will immediately be uploaded as long as some type of network connection is available.

Similarly, if the user configured the additional settings such that media will be uploaded without review, such media will be immediately shared. In one or more embodiments, the default setting will be to upload only after user review has occurred. However, as stated, this can be changed. A confirmation dialog 146 may be presented if review settings are changed after a media recording session has started.

Figure 1D:
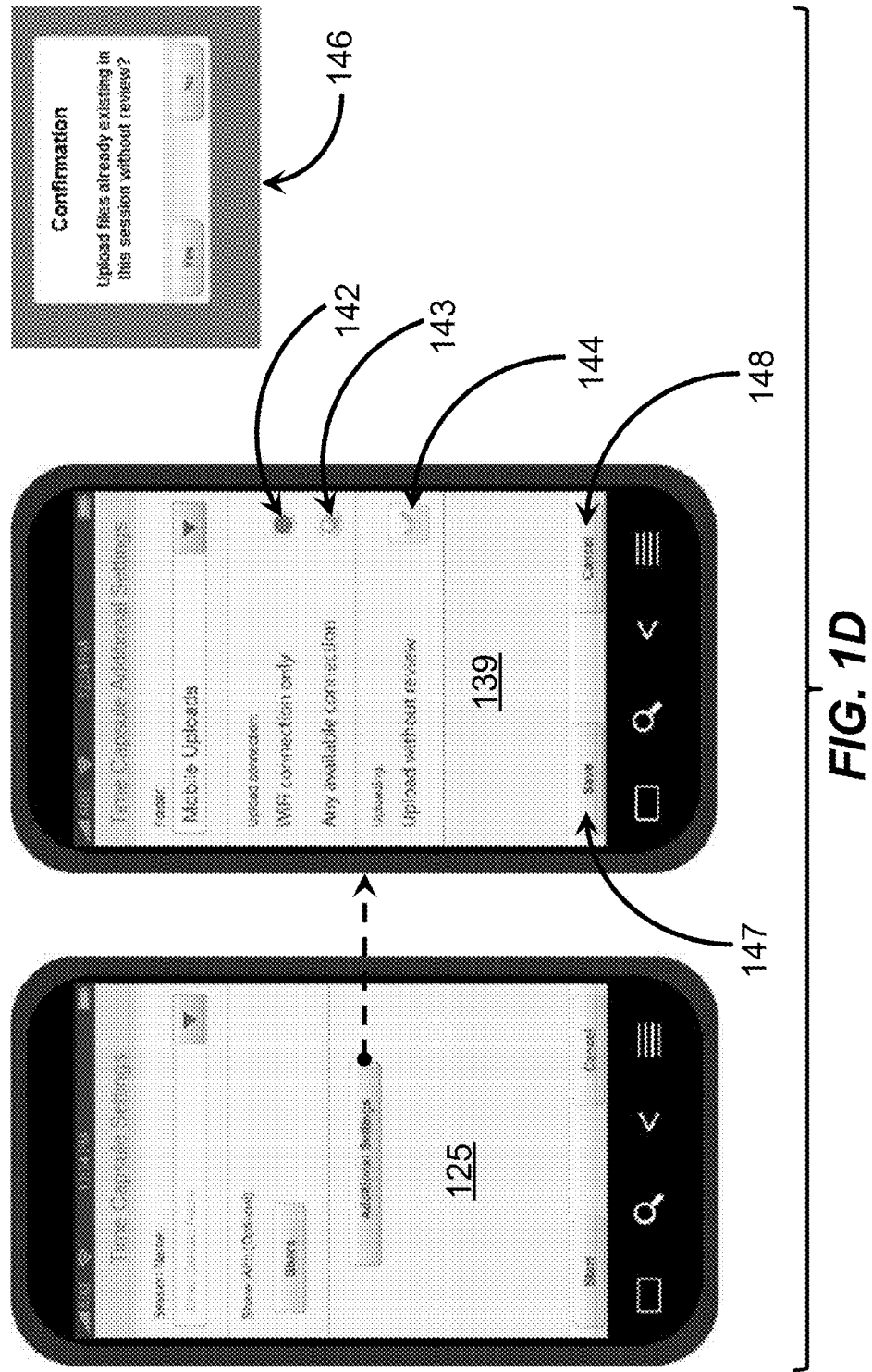

As can be seen from FIG. 1D, the additional settings screen 139 may include checkboxes 144, radio buttons 142, 143, or other user interface elements to allow the additional settings described above to be configured. Once the additional settings have been configured as desired, they may be saved by engaging a "Save" button 147. Alternatively, changed to additional settings may be canceled by engaging a "Cancel button 148.

Figure 1E:
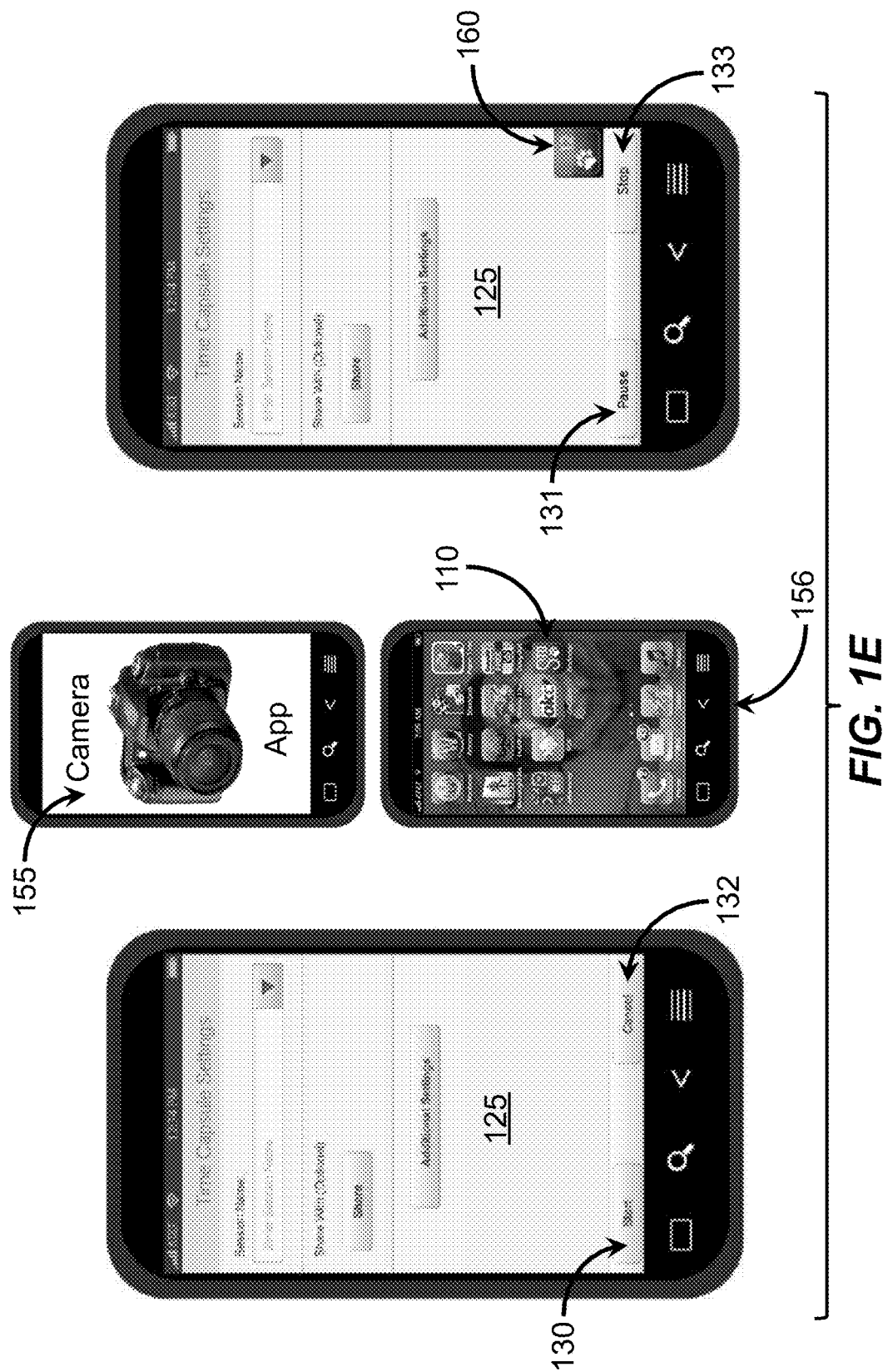

Media capture or recording will now be described with regard to FIG. 1E. Media recording may be initiated in various ways, including by engaging a "Start" button 130 on the settings screen 125 as shown in FIG. 1E. Upon actuating the "Start" button 130, the user is immediately taken to their native camera application 155 within their device. This allows the user to begin creating photographs or video captures to include within their Time Capsule share. Upon completing video or picture session, the user may exit their camera application 155. The user may return to the time capsule function by actuating the time capsule icon 110, or by depressing the "Back" button 156 on their device. Since device operating systems vary, there is no way for Time Capsule to determine where the device will default to once the camera application has been exited. Exiting the camera application does not pause or stop the Time Capsule (media capture) feature. Time Capsule will continue to run in the background until the user manually terminates the session by actuating the "Stop" button 133 (described below).

As shown in FIG. 1E, the user returns to the time capsule settings screen 125 when re-entering the program after a session has begun. The user can re-enter the program by accessing the icon 110 on their device. Once the user re-enters Time Capsule after starting a session, the "Start" button 130 will now appear as a "Pause" button 131 allowing the user to pause the current session. In addition to the "Pause" button, the "Cancel" button 132 becomes a "Stop" button 133. Depressing the "Stop" button 133 will end the session. A status icon 160 may also be presented to indicate the Time Capsule is running. The status icon 160 (or other indicator) may also provide other information. For example, in FIG. 1E, the status icon 160 shows how many items have been added to the media recording session.

It is noted that there is typically no expiration time associated with a media recording session. The user can activate a media recording session and terminate/end it at anytime with no predetermined window of time. In this manner, a media recording session can run indefinitely, and will continue to log and monitor new media being added to the mobile device (including media captured by the mobile device or media transferred to the mobile device).

As described briefly above, media editing functionality may be included. In general, the media editing functionality allows the user to review the media before sharing it with other users. As an example, if a user is at a car show taking pictures and accidentally shoots a bad photo, it can be easily eliminated from the share prior to initiating the share. Likewise, media on the device that was created at an earlier date (prior to the time capsule timestamp starting the event) can easily be added to the share.

During the review process, media can be arranged in any order that the user chooses. Using the car show example, the media owner can choose to put the car pictures, lectures, video and notes in any order they'd like, to enhance the experience of the media recipients. If they do not wish to choose an order, the media will be shared in the order in which it appears on the device. Reverse order, random, and custom orders may also be selected.

Figure 1F:
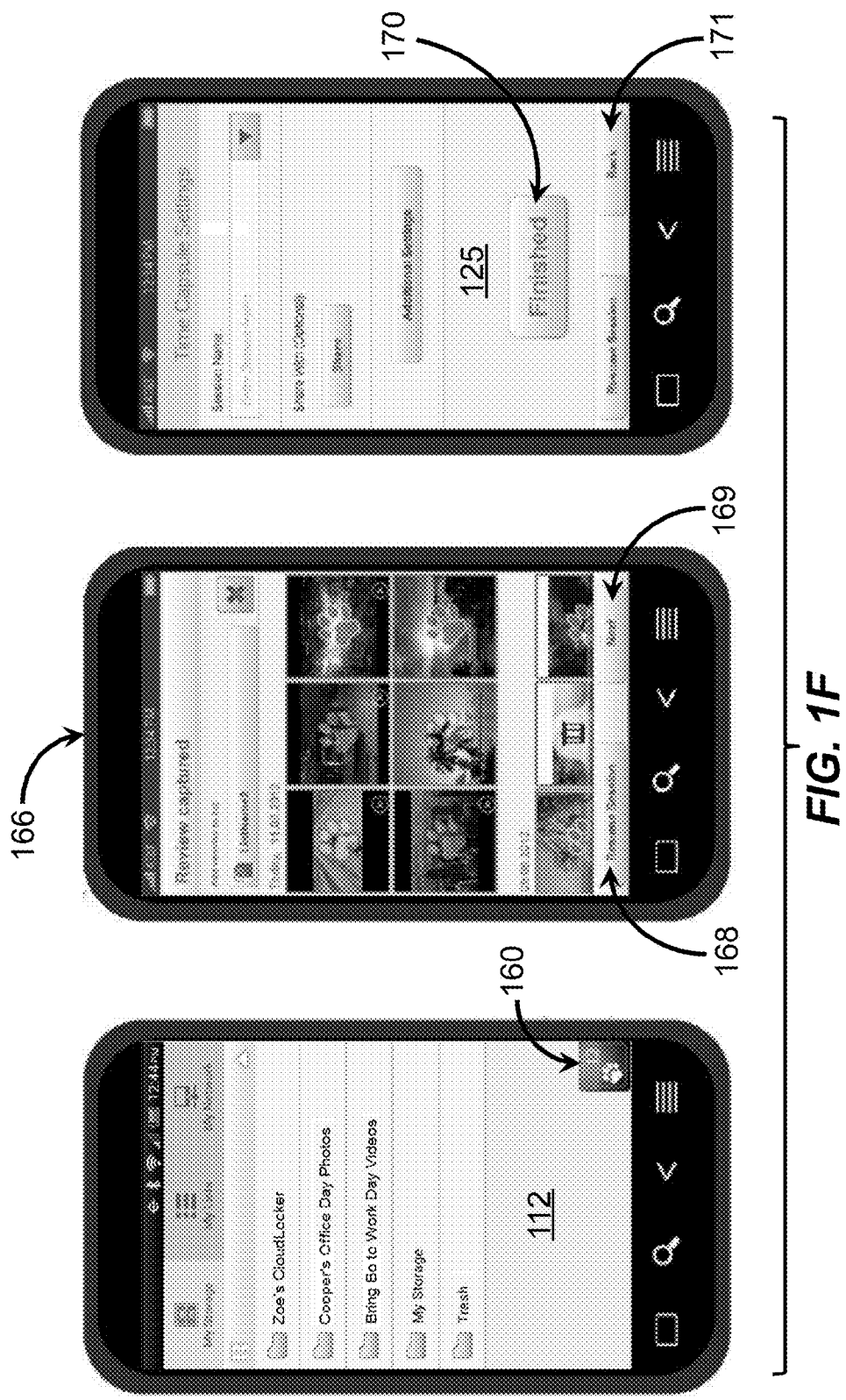

FIG. 1F illustrates an exemplary review screen 166. The review screen 166 may be activated in various ways, including by engaging the status icon 160 or button from the application window 112. On the review screen 166, the user can select/deselect media to be contained in a share. An icon or other indicator may show which media has been selected.

The user may then continue the media recording section (where additional media may be captured) or share the media, such as by engaging a "Resume" button 168 or "Next" button 169, respectively.

Engaging the "Next" button 169 may activate a settings screen 125 having a "Finished" button 170. The "Finished" button 170, when engaged, will typically activate media sharing. A "Back" button 171 may be provided to allow the user to return to the review screen 166 if additional review or changes are desired.

Link Locker

Link Locker is file management system and method that allows URL links (such as those from the Internet) to be treated, managed, and shared exactly like files or folders. In this manner, Link Locker allows a user to store and share URL links in the same manner as an actual file. URL links to media on the Internet will typically be captured and stored by way of an application file that the user can download directly to their computer or their mobile device. As used herein, a URL link is a unique identifier that points to a specific location on the Internet or other remote digital repository. These links are typically unique to the specified media.

Figure 2A:
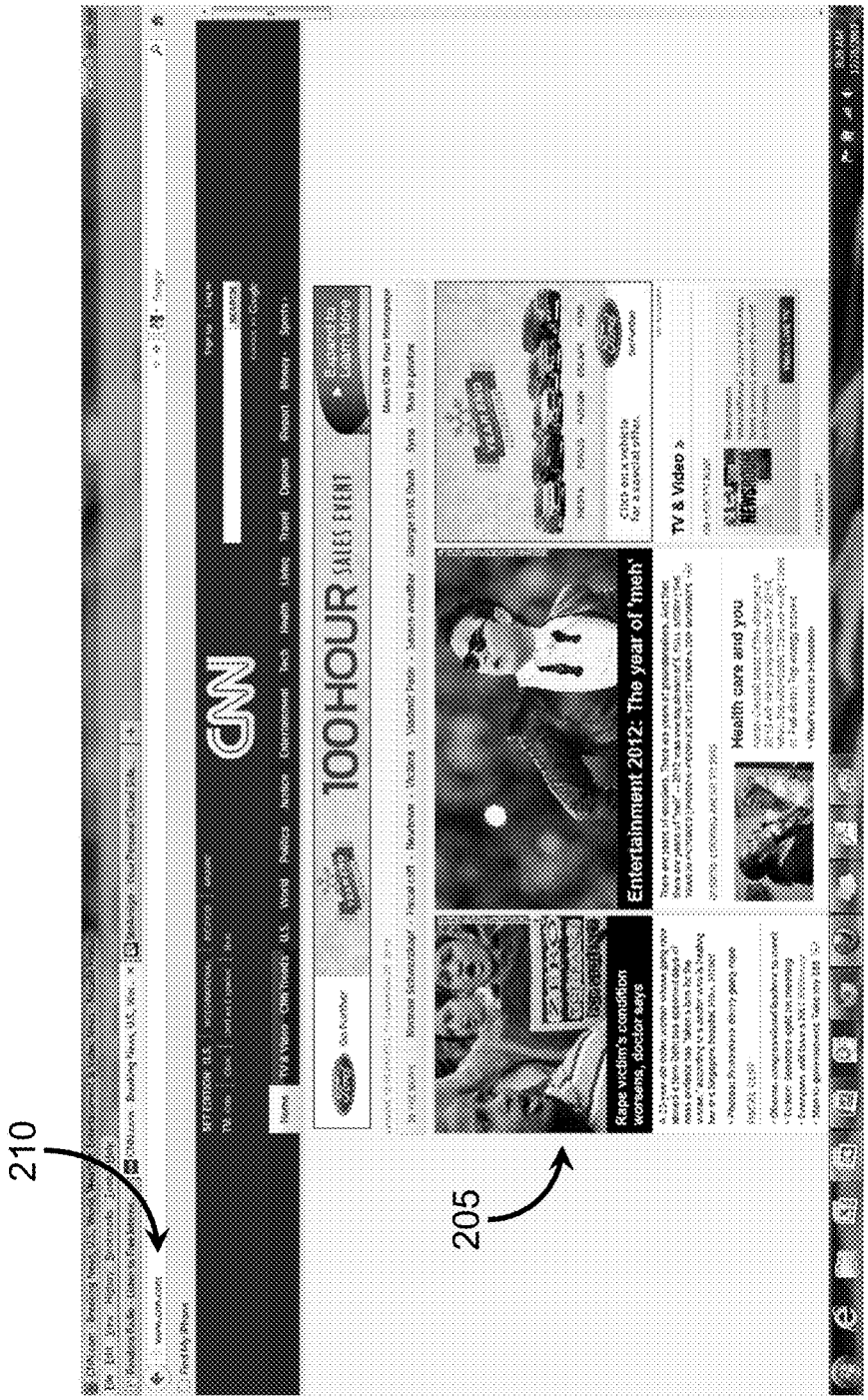
FIGS. 2A-2I illustrate operation of Link Locker in an exemplary embodiment of the media management system.

Operation of Link Locker will now be described with regard to FIGS. 2A-2H. As shown in FIG. 2A, the user may navigate to a web page 205 they desire. The user can then copy the URL link 210 to the file management system to add it to the system. As will be described further below, a link capture button 211 (FIG. 2B) may reside on the main page or toolbar of the browser, allowing the user to simply click the icon to capture the URL information they are interested in storing and/or sharing (similar to a "bookmark" function).

Figure 2B:
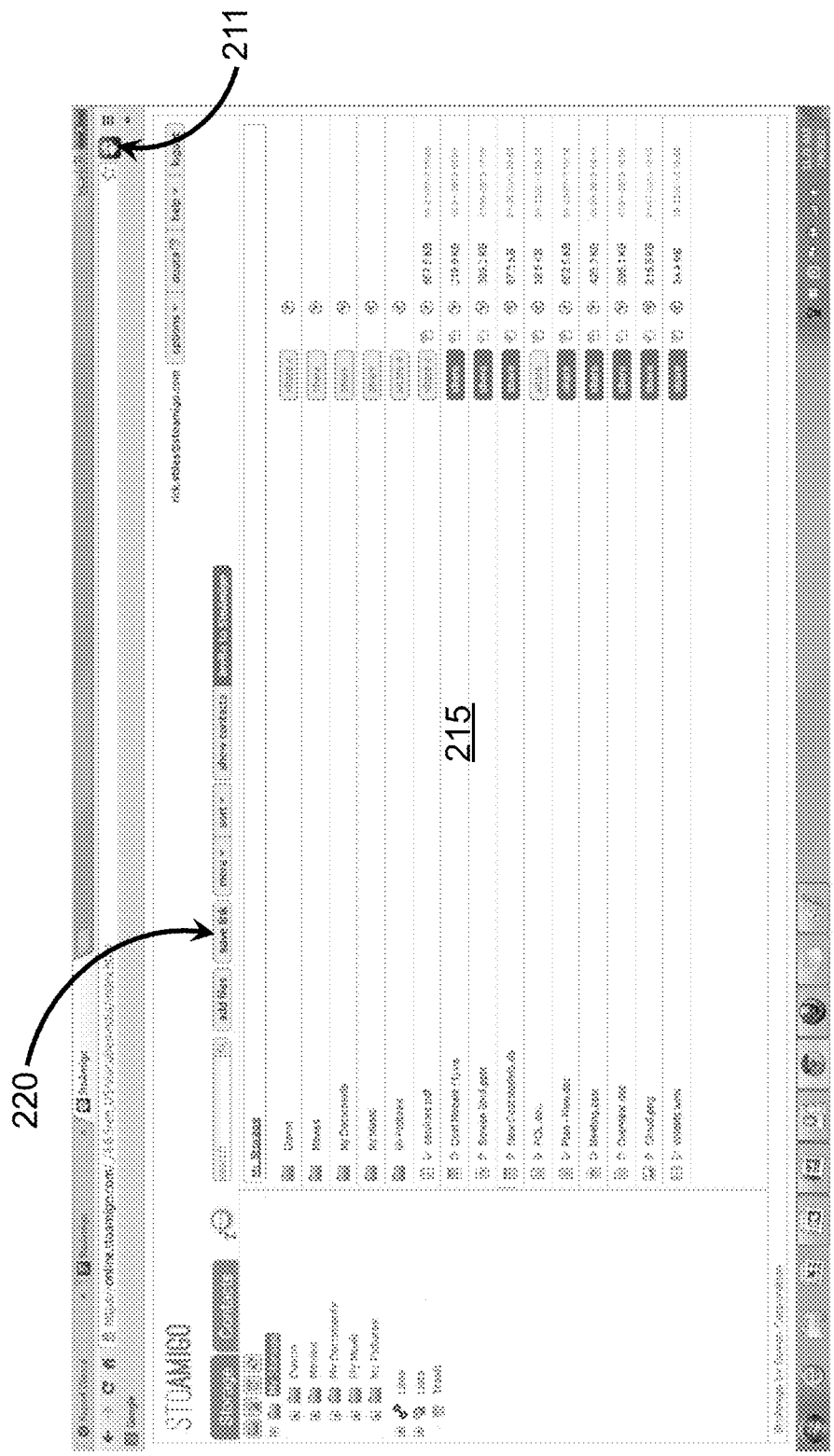

Once the information is recorded, the user can go into their file management system account, as shown in FIG. 2B, and the URL will be listed on a file management screen. The file management screen 215 may resemble a typical file management screen that you would find within the Windows, Mac, or Linux operating systems. A "Save Link" button 220 may be provided within the file management screen 215 to allow users to save the URL link.

Figure 2C:
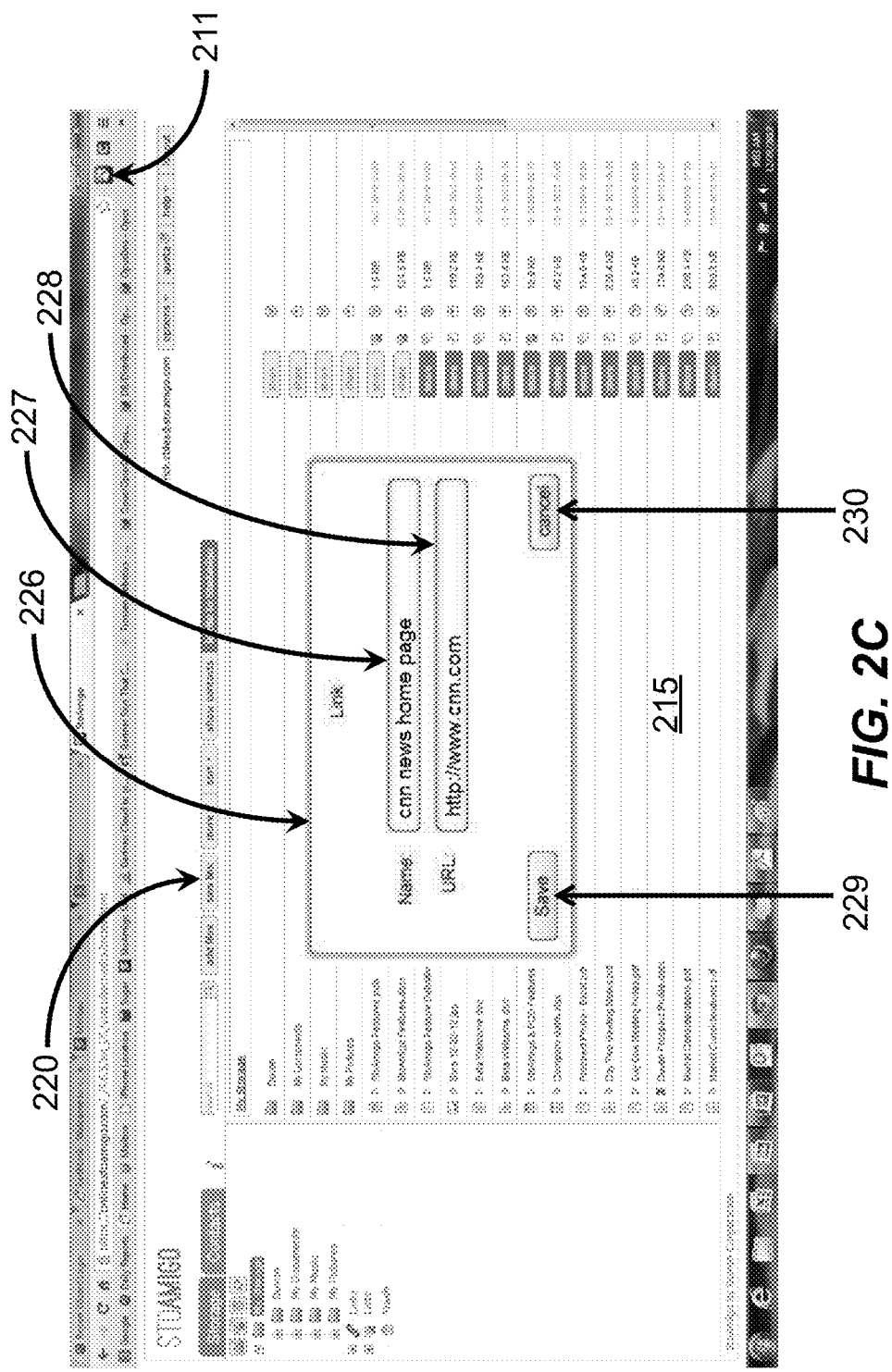

Once, the "Save Link" button 220 is engaged, the user may be prompted to name the link and to store it in a specific menu (folder location) within the file management system's database, such as via a save dialog 226 as shown in FIG. 2C. An example of this would be a user collecting recipes from the Internet. They would create and store the link within the file management system in their "recipes" folder. One or more input fields 227, 228 may respectively be provided to accept a name for the URL link as well as the URL link itself. A "Save" button 229 may be provided to save the URL link into the file management system. The user may engage a "Cancel" button 230 to cancel the saving operation.

Figure 2D:
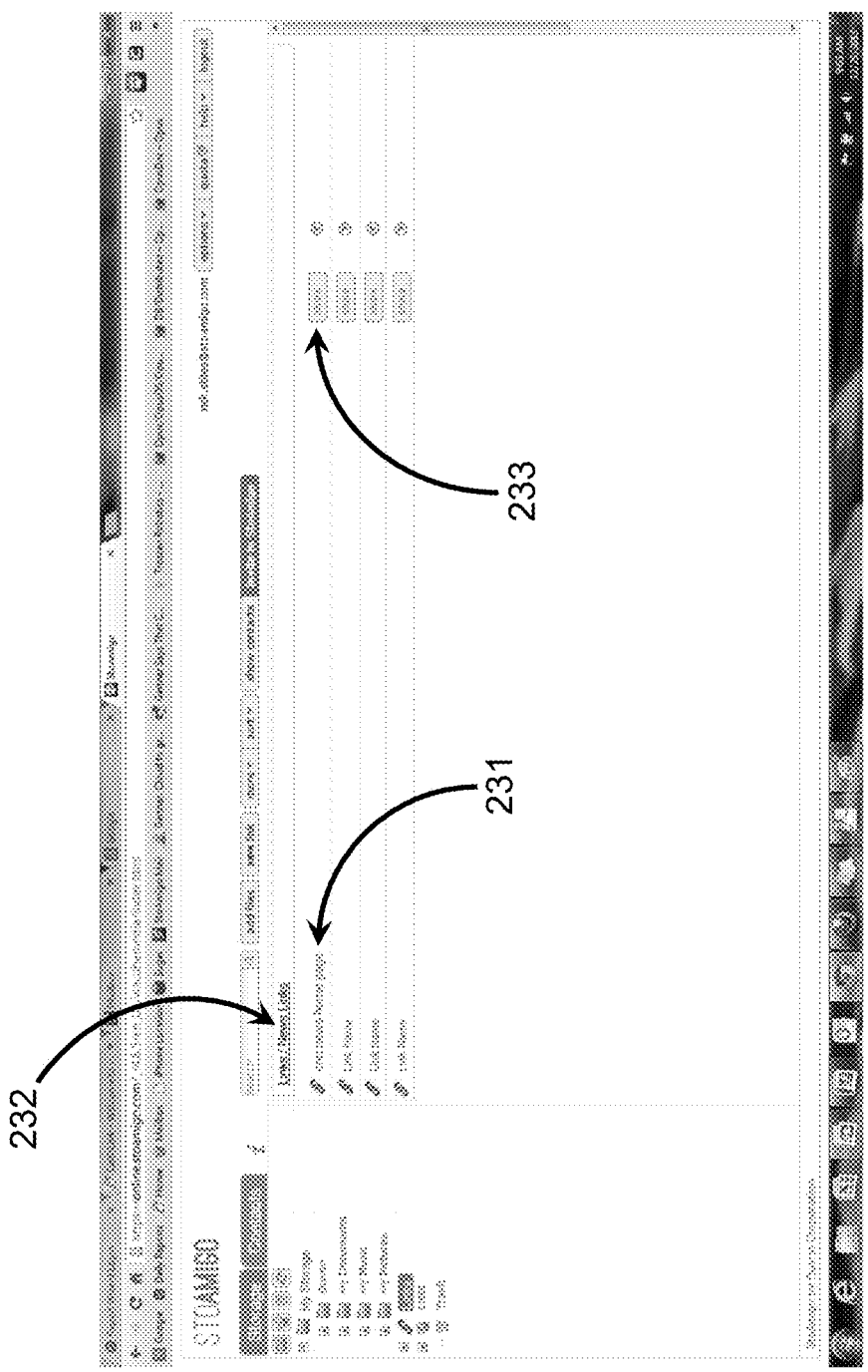

Referring now to FIG. 2D, it can be seen that a saved URL link 231 will appear in the folder location 232 specified. Once the URL link is stored within the file management system, the user has advanced sharing and management capabilities for the URL link. These include:

1. Renaming the URL links to any identifier the user chooses, without compromising the integrity of the URL link. URL links can be renamed an infinite amount of times.

2. Storing the URL link anywhere within the system and move or relocate it at anytime.

3. Sharing the URL link in groups with multiple recipients simultaneously.

4. Adding the URL links to a list or series of links or other media that are selected by the media owner for sharing. These lists may be created by simply selecting media from within the system for inclusion in the share, and then initiating the share. When using lists, the URL links can be shared along with other types of media including video, audio, files, folders, notes and other electronically stored media. List sharing allows any combination of links, files, folders and other media to be shared.

Figure 2E:
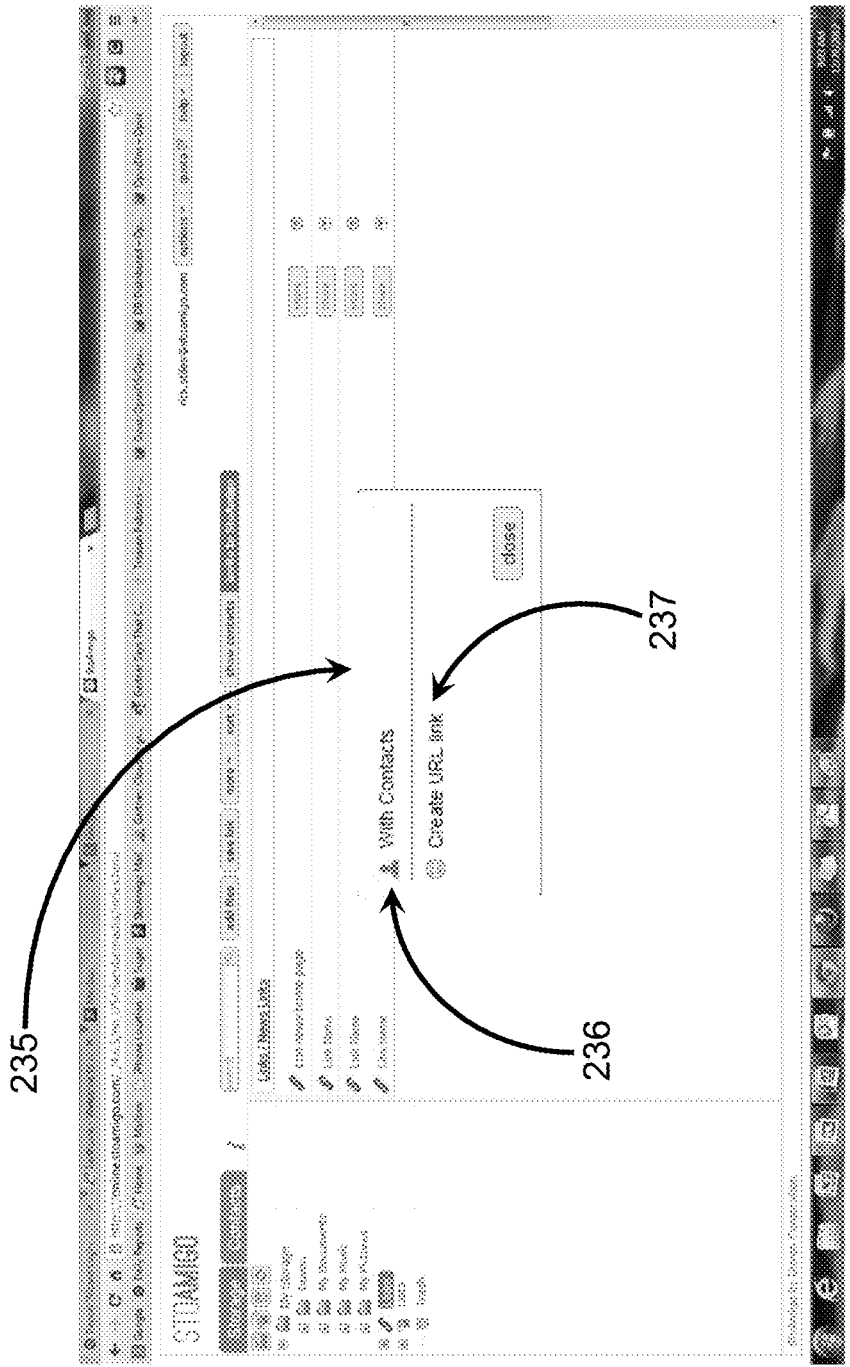

A user may share a save URL link 231 by engaging a "Share" button 233. As shown in FIG. 2E, the user may then select how URL links should be shared via a sharing options dialog 235. For example, URL links may be shared with a user's contacts or via a sharing link generated by the file management system for such purposes. Various buttons 236, 237 may be provided to accept this user selection.

Figure 2F:
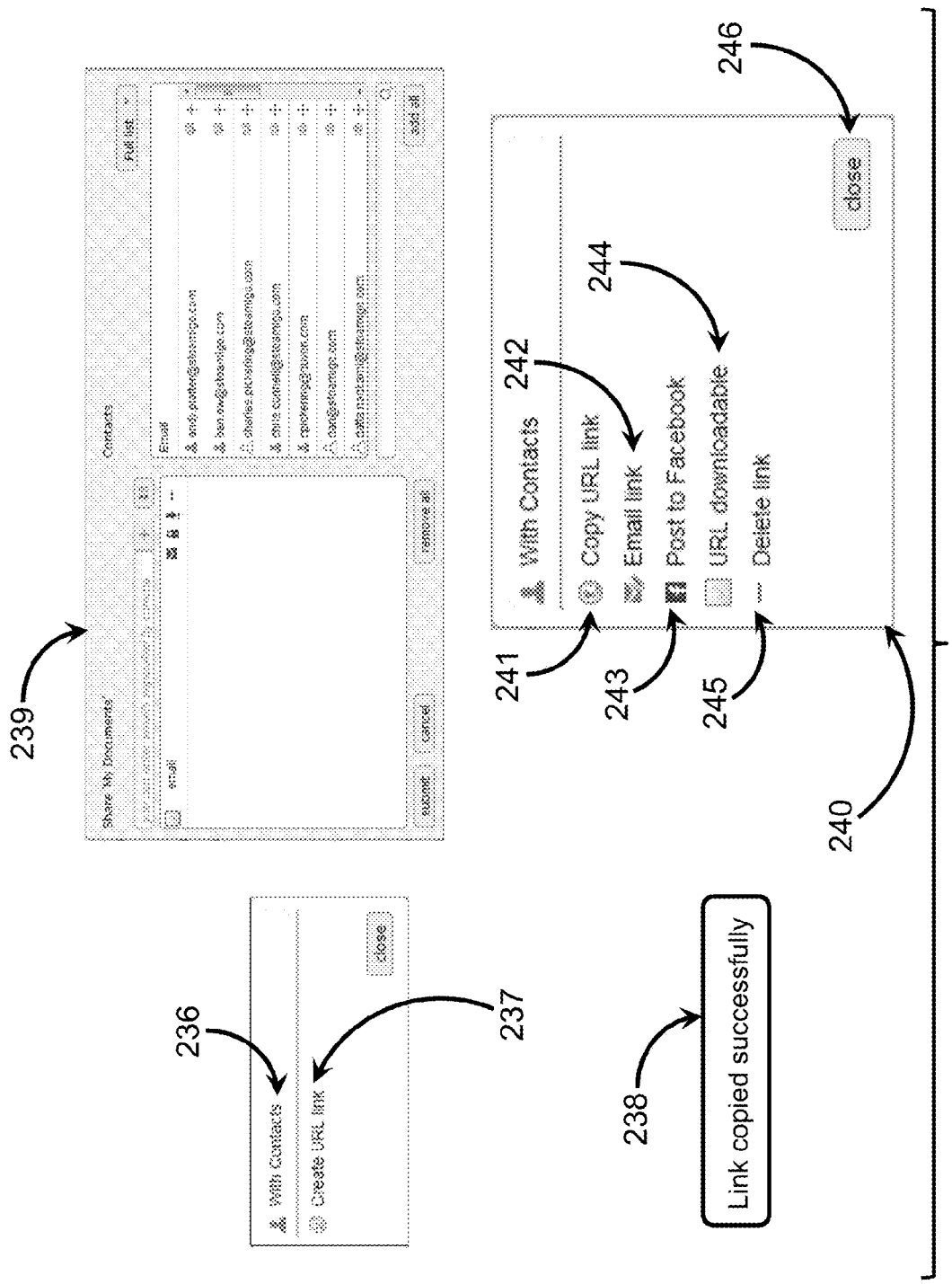

Referring to FIG. 2F, a contact listing 239 may be displayed if the user elects to share 236 with his or her contacts. If the user elects to share by creating a URL link 237, a dialog box 238 will appear in the upper left-hand corner of the user screen, confirming to the user that a URL link has been copied for the share. The user may now paste that link into a variety of different receptacles for sharing the media. These include (but are not limited to) emails, documents, publications, chat sessions, text message sessions and other various written communication methodologies. The sharing with contacts dialog 240 may provide one or more sharing options to allow sharing in various ways. For instance, as shown in FIG. 2D, URL links may be shared by copying the sharing link for pasting to a desired location by email, via Facebook, via downloadable URL. An option may be provided to delete the sharing link as well. One or more buttons 241, 242, 243, 244, 245 may be associated with these (and other) sharing options to allow a user to select the desired sharing option. A "Close" button 246 may be engaged if the user decides to cancel the sharing operation.

Figure 2G:
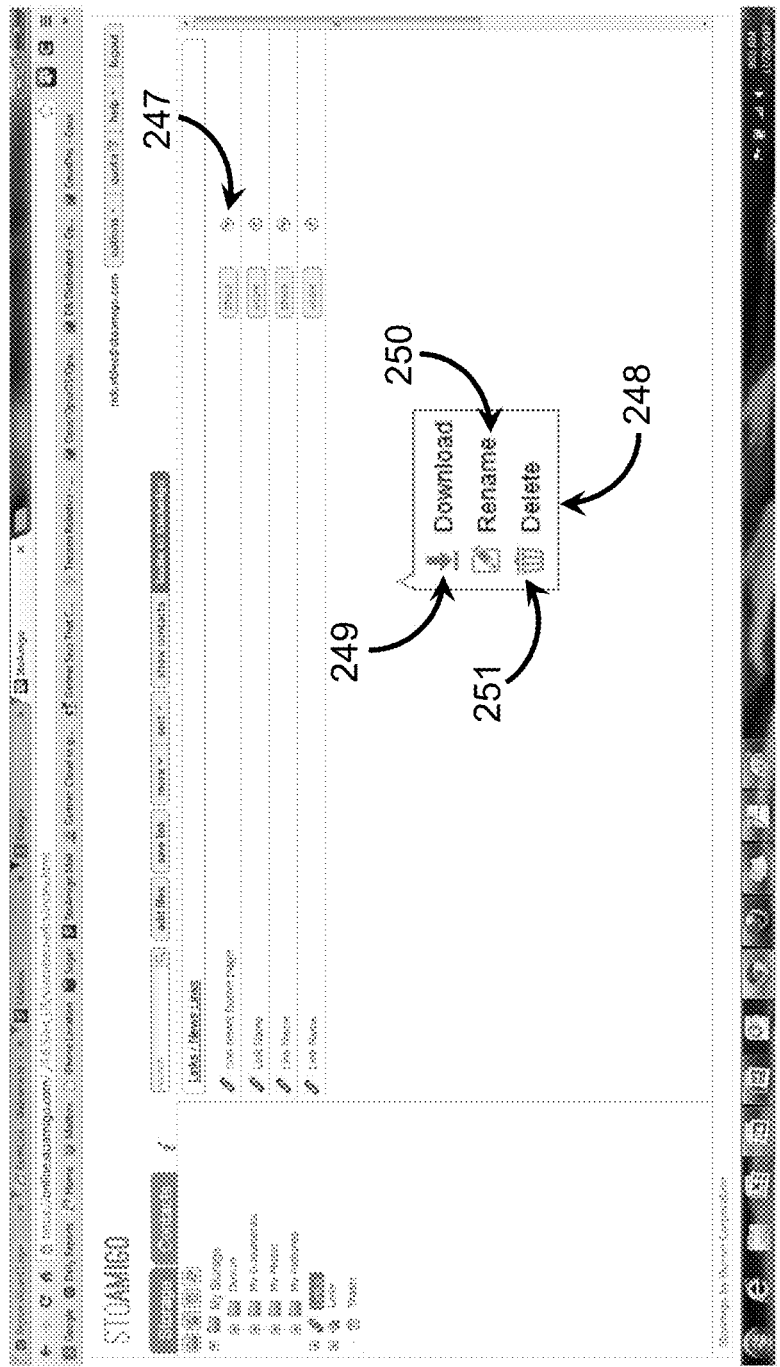
Figure 2H:
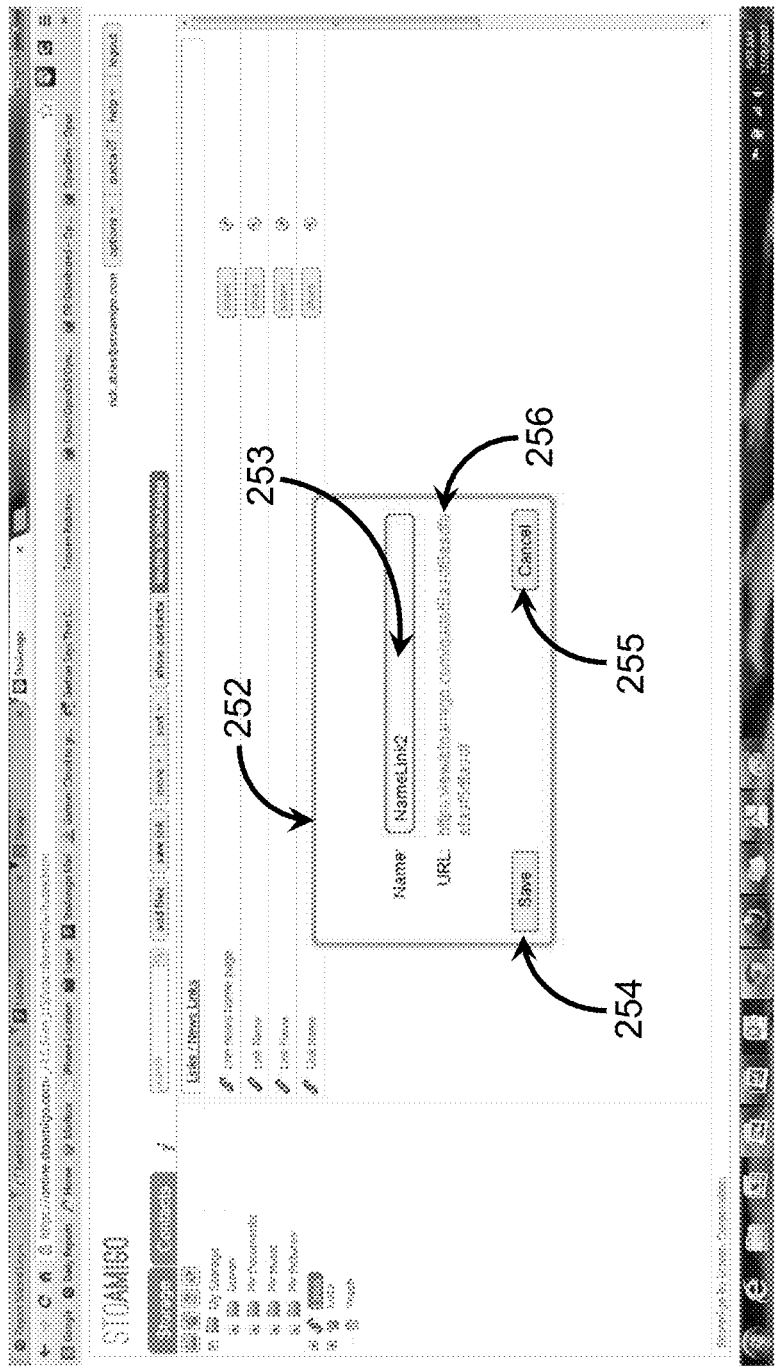

The file management system may also provide general file management capabilities for URL links. As shown in FIGS. 2G-2H for example, URL links can be edited by engaging a "Manage" button 247 to reveal editing operations 248. Some exemplary file management operations include renaming a URL link and deleting a URL link. A "Rename" button 250 and "Delete" button 251 may be presented to respectively activate such operations when engaged. It is noted that a "Download" button 249 may also be provided to allow a URL link to be downloaded to local storage.

A rename dialog 252 may be used to prompt the user to edit the current name of a URL link. As can be seen from FIG. 2H, an input field 253 may allow the name to be edited, while a "Save" button 254 allows the user to save the changes to the URL link's name. A "Cancel" button 255 is provided to cancel the renaming operation if the user so desires. It is noted that the user cannot modify the URL link 256 during this process.

It is noted that URL links do not need to be downloaded to the receiving device to be actuated. They can be actuated from the host device, taking the user immediately to the link address. This prevents the recipient of the media or link from using valuable space on their mobile device for storing shared media. All of the shared media can easily be stored within the host file management account.

Unlike sharing files or folders, permissions are not assigned to URL link shares. Since URL links are public domain, permissions are not required. If a URL link is shared within a list, the permissions governing the share (set by the share owner) will be applied only to the physical media (files, folders, songs, movies, videos, notes, etc.) being shared, and will not apply to the URL links.

As with other methods of sharing disclosed herein, these Link Locker shares can be eliminated at any time the media owner chooses. For instance, a media owner can simply choose to terminate the share based on the user or the media being shared. This provides maximum versatility to the media owner.

Figure 2I:
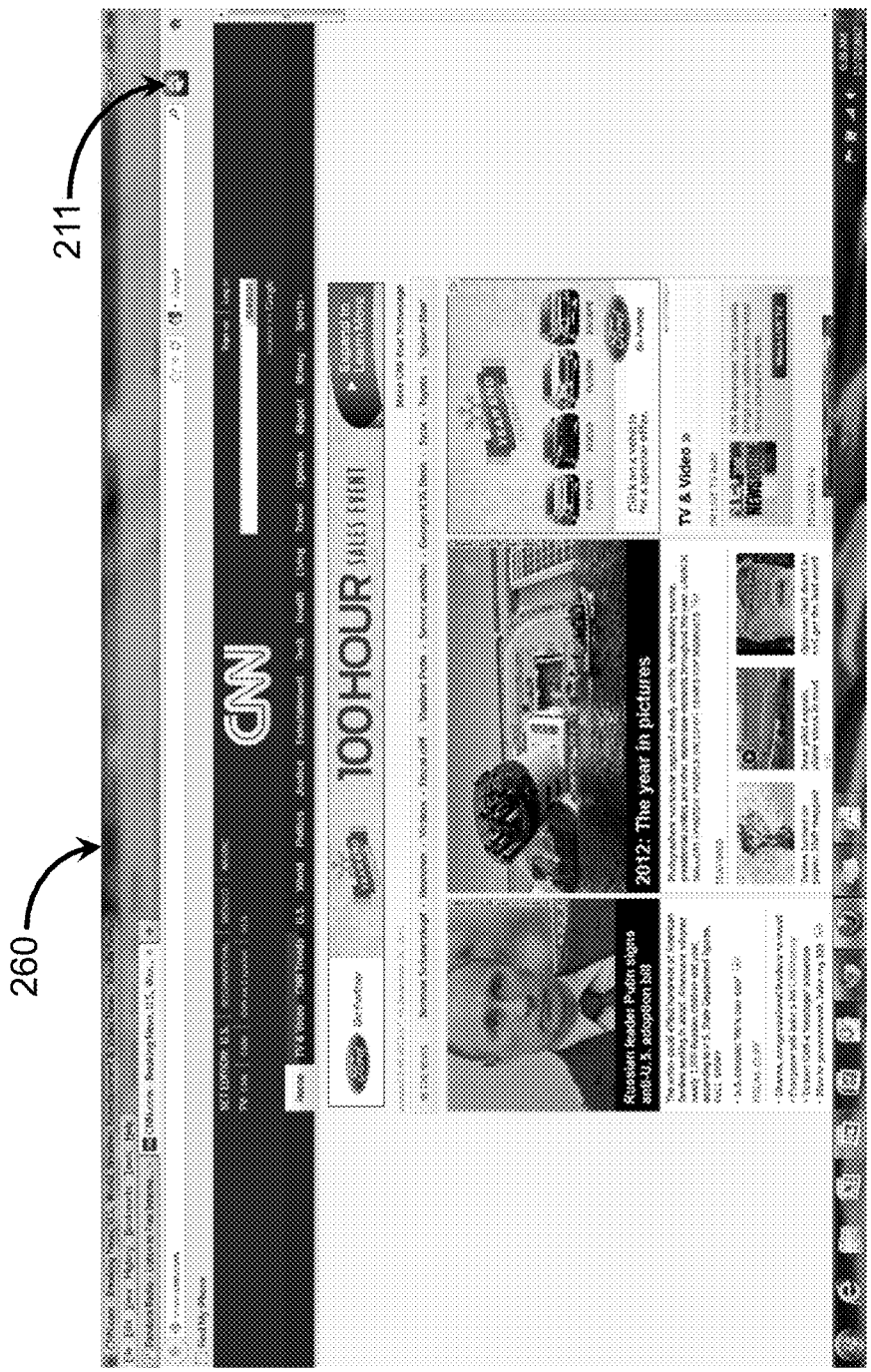

In one or more embodiments, a portion of Link Locker may reside as an add-on or plugin to a web browser like Chrome, Firefox, Internet Explorer or other browser designed to access and navigate the Internet. For example, as shown in FIG. 2I, a link capture button 211 is provided at the user's web browser 260. Activating the link capture button 211 will automatically store the current URL link on the web browser 260 in the file management system. Thereafter, the URL link can be accessed, managed, stored, and shared as described above.

Adaptive Media Grouping

Systems and methods for file organization or grouping are also disclosed herein. In general, Adaptive Media Grouping allows for grouping of media within a mobile device based on a creation time or first appearance timeline. The groupings may be coarse or fine in definition, based on the slider or rotary controls set by the user. In this manner, media is grouped by creation date and time for the purpose of finding specific past events within the mobile device. In addition to the date and time of creation for media grouping, media may also be grouped by type within the mobile device. This enhances the user's ability to group media for the purpose of being able to instantly identify and share a specific group of media, identified by either time and date, media type, or both.

Stated another way, media grouping as disclosed herein allows files, folders, and other media to be sorted and grouped within the device along a continuum between coarse media groupings and fine media groupings, based on a creation timeline of the media, and the type of media present within the device. In this manner, the user will have the capability of actuating a slider control or the like on the screen of their mobile device to allow media to be grouped on their device based on creation time and media type.

The terms "coarse" and "fine" refer to the level of detail with which the user wishes to sort their media. Various user interface elements, such as a slider or a dial, may be provided to allow a user to indicate a more coarse or fine level of media grouping and selection. A media grouping system that identifies each piece of media stored within the device by date (of appearance on the device) and by file type may be provided to allow such control over file organization.

Operation of Adaptive Media Grouping will now be described with reference to FIGS. 3A-3D. It is contemplated that the media grouping system may be built into a mobile device, such as via its operating system or may be provided as a separate software application. In one or more embodiments, a user of a mobile device may engage a button or icon to activate the media grouping system.

Figure 3A:
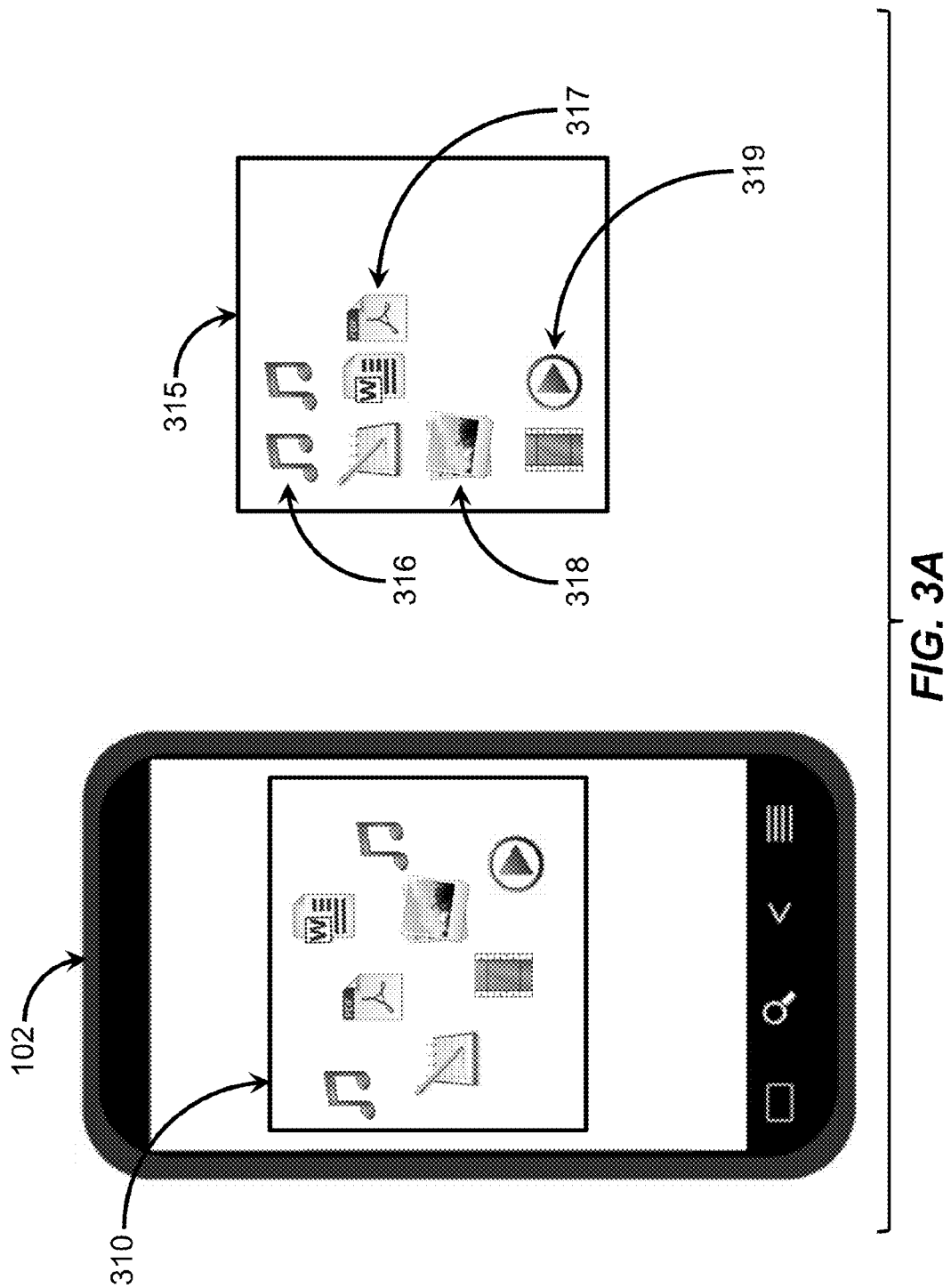

FIG. 3A illustrates an exemplary mobile device 102 storing various media on its storage device 310. The media grouping system may identify media by type and by its first appearance on the storage device 310 to permit a user to access such media accordingly. As shown by storage device 310, the media is stored on the device, but not sorted in any fashion. Storage device 315 illustrates the media after it has been sorted using the adaptive media grouping process. Some exemplary types of digital media items or files include music 316, documents and notes 317, pictures and photos 318 and movies and videos 319. In general, the media grouping system will be configured to log and sort any media type that can be captured or stored on its mobile device 102.

Figures 3B, 3C:
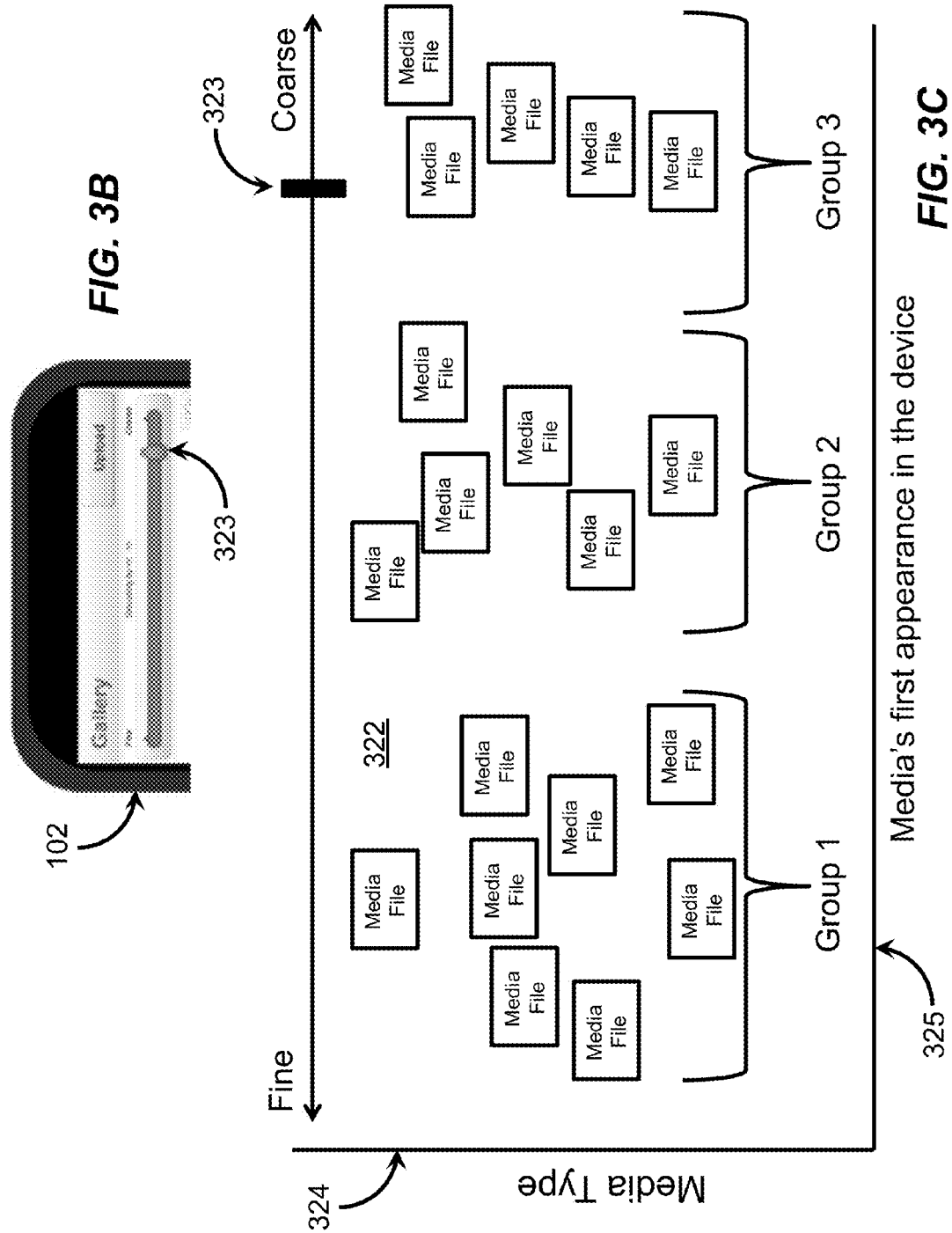
Figure 3F:
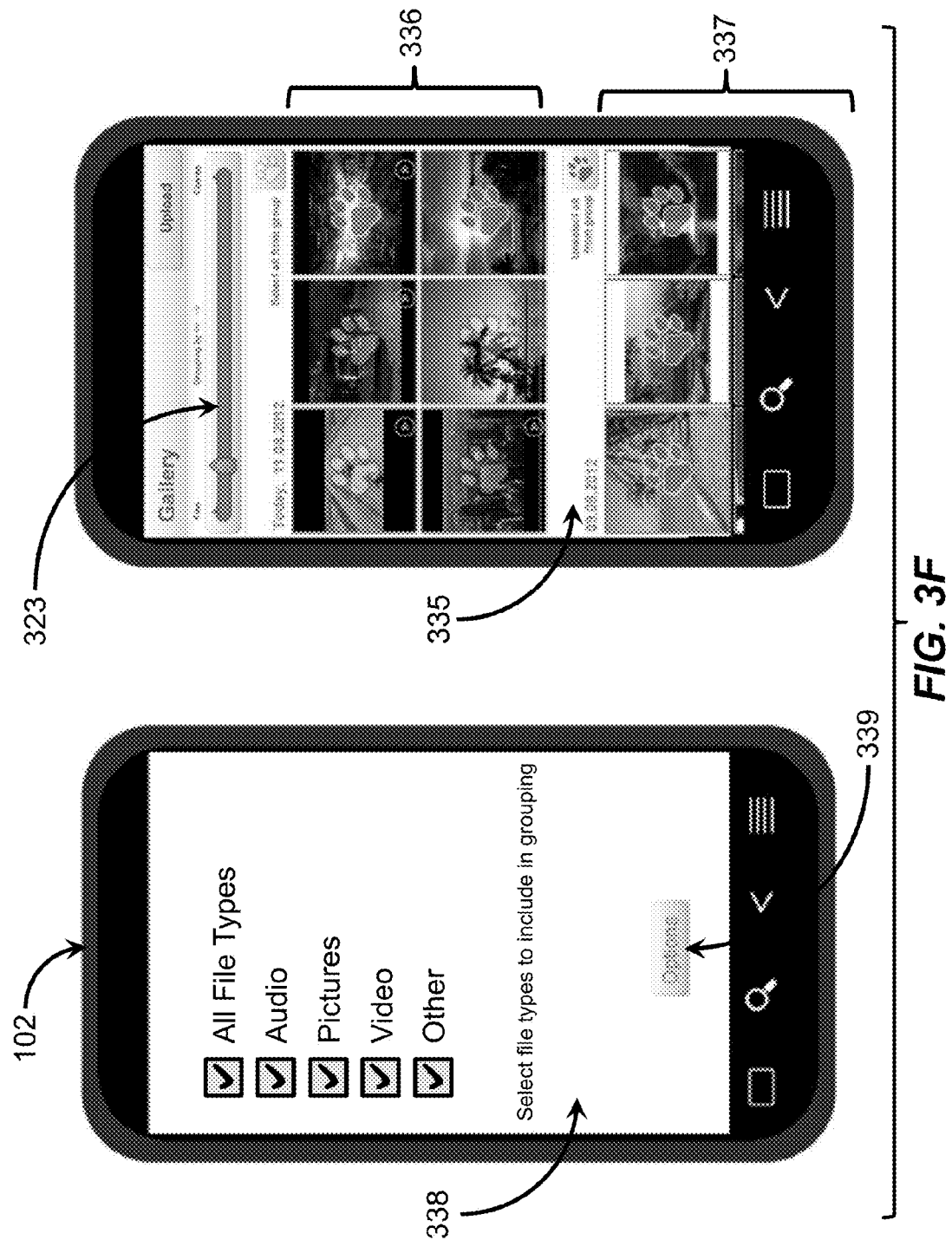

As shown in FIGS. 3B-3E, once the media grouping system is activated, a slider 323 (or other control) will appear on the screen which will allow the user to adjust it to the right or the left, depending on the level of granularity they require in their media search. Grouped digital media items can then be selected and viewed in sections based on the creation time frame and media type. Each group of digital media items will typically be delineated by an indicator or marking. For example, digital media items that are in a grouping may be within a box or other enclosed shape. Alternatively or in addition, one or more lines, spaces or other indicators/markings may be presented between groupings of digital media items to indicate which digital media items are grouped together. As shown in FIG. 3C for example, the groupings of digital media items are separated by a relatively larger space (as compared to the spacing of the digital media items within a grouping) between the groupings. In FIG. 3E, dashed lines indicate individual groupings of digital media items. FIG. 3F shows an exemplary embodiment where groups of digital media items are delineated by a title bar provided by its user interface 335 that separates individual groups of digital media items from one another. As described above, adjusting the slider 323 would cause various digital media items to move from one group to another.

FIGS. 3C and 3E respectively illustrate coarse and fine organization of media. As can be seen in FIG. 3C, media 322 is loosely grouped by type and first appearance (i.e., creation time) on the mobile device when in a course media grouping. In the example of FIG. 3C, three groupings of the media on the mobile device are generated by the selected coarse media grouping. In contrast, FIG. 3E shows that a fine media grouping groups media tightly based on type and its first appearance on the mobile device. Fine media groupings result in more granularity and more groups as compared to coarser groupings. As can be seen in FIG. 3E, seven media groupings result from the finer selection as compared to the three groupings of media 322 created in FIG. 3C. The number of groupings present is a result of the time, date and media type being aggregated. The number of groupings in the examples of FIGS. 3C and 3E were restricted to enhance understanding and explanation of the functionality. Total number of groupings is determined by the first and last appearance of media, media types, and level of granularity selected in file aggregation.

As can be seen, media may be presented, in coarse and fine groupings, organized by type 324 in the vertical direction and by first appearance 325 in the horizontal direction (or vice versa in some embodiments). The order of media types may be predefined or selected by a user. For example, within a group, a media of a first type may be positioned above media of a second type. In a more specific example, within a group, documents may be positioned above music and video files. This allows a user to quickly and easily locate various media on his or her mobile device, even when such mobile device has a limited or small screen size/resolution.

In one exemplary embodiment, various characteristics of the media may be weighted to produce the coarse and fine groupings. Some exemplary characteristics include, the creation time of the media and the type of media (e.g., music or video). These characteristics will typically be associated with the media. For example a media file may have a creation time and type associated thereto. In one or more embodiments, the file itself may have the characteristics embedded therein. In other embodiments, the characteristics may be stored in a database or other records.

Other characteristics may be used as well. For instance, the length or size of the media, last access, or last modification time could be a characteristic upon which a coarse or fine media grouping is based. In addition, in some embodiments, the user may be prompted to enter a name, description or both for the media. In such case, the name, description or both could be used in grouping individual media items as shown in FIGS. 3C and 3E.

FIG. 3F illustrates an exemplary graphical user interface 335 displayed on a mobile device 102 showing media groupings 336, 337. A slider control 323 is provided to allow a user to adjust the groupings. As can be seen, the fine and course media grouping is advantageous in allowing users to quickly and easily find particular media via their mobile device. The file selection menu 338 for the coarse and fine media grouping can be used to determine the file types for grouping. The types of files represented in the selection screen 338 are to be used as an example. The actual file types are not limited to those pictured, and may contain an alternate options menu 339 for additional granularity.

In operation, moving the slider 323 from fine to coarse generally increases the number of digital media items that meet the criteria for being in a particular group of digital media items. For example, as shown in FIGS. 3C and 3E moving the slider 323 from fine to coarse has expanded the period of time within which a digital media item has to be created to be in a particular group. One way this can be accomplished is to identify the earliest and latest creation time for all digital media items and determine the period of time between the earliest and last creation time. As the slider 323 is moved from fine to coarse this period of time would be divided into fewer portions. The digital media items would then be grouped into these portions of time based on their individual creation times. To illustrate, in FIG. 3E the overall period of time has been divided into seven portions for a fine media grouping, while in FIG. 3C, the overall period of time is divided into three portions for a coarse media grouping. Likewise, as the slider 323 is moved from coarse to fine, the period of time would be divided into an increased number of portions, as shown in FIG. 3E.

Within a grouping, digital media items may be arranged according to their type as described above. For example, within a group digital media items of a particular type may be positioned directly adjacent to one another, such as shown in storage device 315 of FIG. 3A. In this manner, subsets of digital media items may be created within a grouping. It is contemplated that arranging digital media items within a group may be optional, such as based on whether a user has activated such functionality at the mobile device 102.

Figure 4:
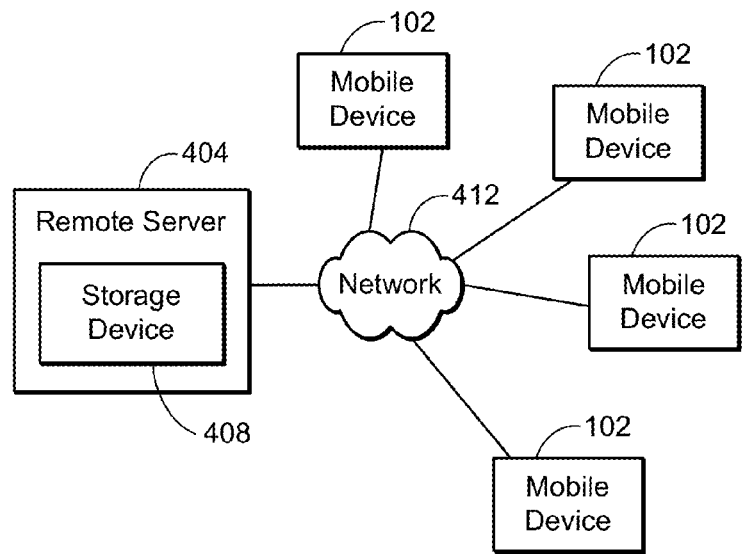
FIG. 4 is a block diagram illustrating an exemplary environment of use for the media management system.

FIG. 4 is a block diagram illustrating an exemplary environment of use for the media management system. As can be seen, the media management system may be used in a network environment including one or more servers 404, mobile devices 102, desktop or other computing devices, or various combinations thereof.

A remote server 404, mobile device 102, or other computing device may communicate directly with one or more other devices via built-in communication devices, such as wired or wireless network interfaces, modems, or the like. Alternatively or in addition, communication may occur through various networks 412, including but not limited to a LAN, WAN, or the Internet. This capability allows communication to occur across a variety of distances and between various locations.

In this manner, media may be stored, shared, organized, or otherwise managed from virtually anywhere. For example, media and/or URL links captured via Time Capsule or Link Locker may be shared with various users through various networks 412. In addition, media and/or URL links may be stored remotely, such as on a storage device 408 of a remote server 404 through various networks 412. In some embodiments, various media and/or URL links may be stored on, replicated on, or backed up to a storage device 408 of a remote server 404 such as for sharing with other users or for later retrieval and use.

Figure 5:
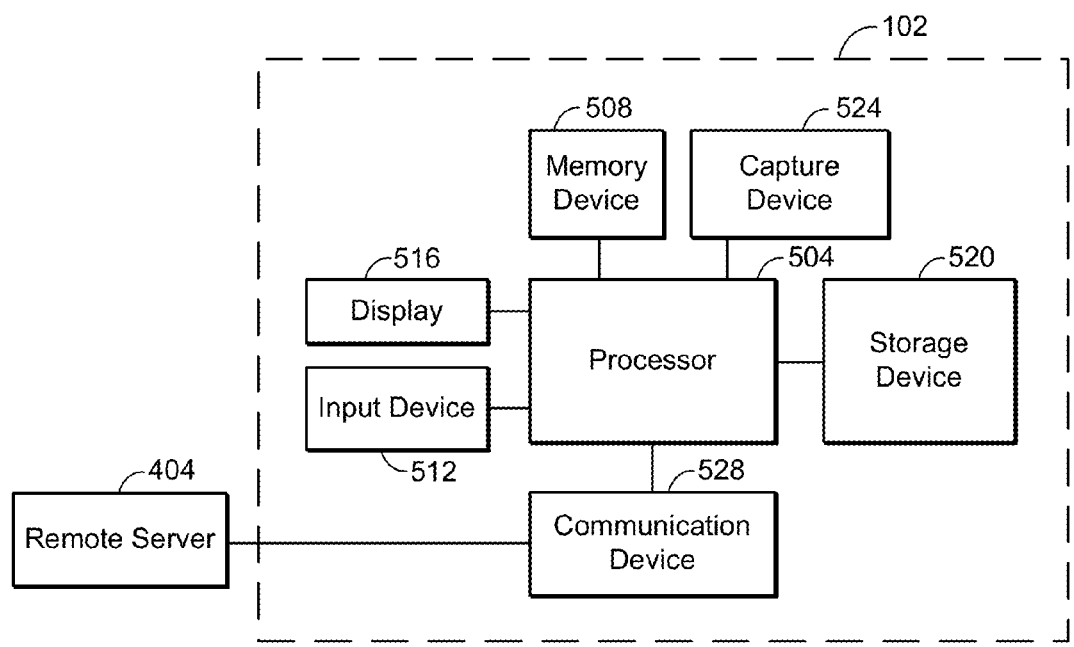
FIG. 5 is a block diagram illustrating an exemplary mobile device of the media management system.

Some exemplary client devices will now be described with regard to FIG. 5. FIG. 5 is a block diagram illustrating an exemplary mobile device 102. Though shown in FIG. 5 as a mobile device 102 it is noted that the media management system may be provided and used on non-mobile devices, such as desktop computers, media players, gaming machines and the like.

As can be seen, a mobile device 102 may comprise one or more processors 504, storage devices 520, and communication devices 528. The one or more processors 504 may be configured to execute machine readable code or other instructions to provide the functionality disclosed herein. In one or more embodiments, the instructions may be hardwired into a processor 504 or may be stored on a storage device 520 for retrieval and subsequent execution by the processor. It is contemplated that the instructions may be downloaded from a server or other external data source for storage and execution on the mobile device in one or more embodiments. One or more memory devices 508 may be used as a cache or other temporary data storage during execution of the instructions.

A storage device 520 may also be used to store media or URL links locally on a mobile device 102. This is advantageous in embodiments where communication between a mobile device 102 and a remote server 404 are limited or unavailable because local storage allows the media management system to be fully operational independent of the operational state of other devices or servers. To illustrate, Time Capsule may store media locally. The user may then retrieve the media via Adaptive Media Grouping such as shown in FIG. 3F. As another example, Link Locker may store URL links and names locally. A user may then retrieve and/or share the URL links directly from his or her mobile device 102 or other computing device (e.g., desktop/laptop computer).

A communication device 528 of the mobile device 102 may be configured for communication with external devices. For example, a communication device 528 may communicate via a cellular radio, Wi-Fi, Bluetooth, Ethernet or the like. A communication device 528 may utilize various standard or proprietary communication protocols and may utilize encryption, compression or other data security and efficiency methods. As can be seen, the communication device 528 may be capable of wired or wireless communication. Media, URL links and other types of information may be transmitted or received by a mobile device 102 via a communication device 528.

Specifically with regard to Time Capsule, it is noted that a communication device 528 may be configured to receive the current time from a remote server 404 or other device. The received time can then be used for time stamping purposes or to synchronize the mobile device's internal clock such that an accurate time is available for time stamping purposes.

The mobile device 102 will typically also include one or more input devices 512 and one or more output devices to allow a customer to interact and use the customer device. For example, an output device in the form of a display screen 516 may be provided to provide information and feedback to a customer, while an input 512 such as a touch screen, one or more buttons, or the like are used to receive input or commands from the customer. As described above, the input and output devices 512, 516 may be used to select access, operate, and otherwise use Time Capsule, Link Locker, and Adaptive Media Grouping.

As can be seen, a mobile device 102 may also include one or more input devices in the form of one or more media capture devices 524 configured to capture various media. For example, a media capture device 524 may comprise various optical, audio, radio frequency or other sensors to capture media. In one embodiment for example, a media capture device 524 may comprise a camera for capturing images, or a microphone for capturing audio.

Figure 6:
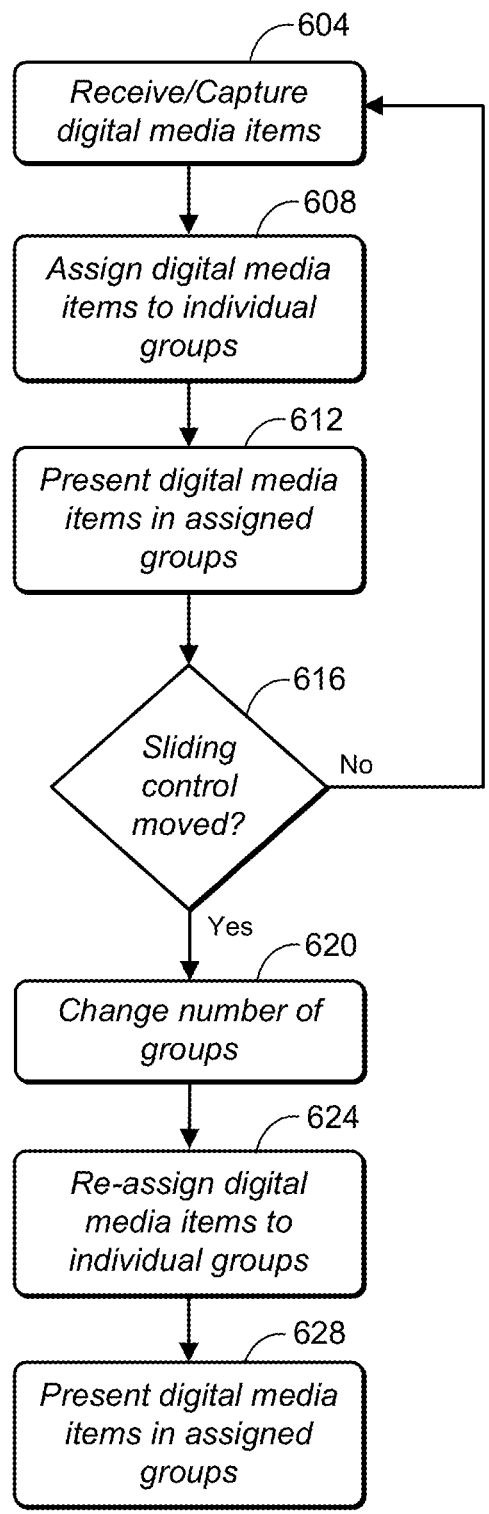
FIG. 6 is a flow diagram illustrating operation of an exemplary media management system.

FIG. 6 is a flow diagram illustrating operation of Adaptive Media Grouping at an exemplary media management system. These operations may be implemented at a mobile or other device of the media management system in one or more embodiments. At a step 604, digital media items may be captured or received by the mobile device. For example, a digital media item may be captured by a camera, microphone or other capture device. Alternatively or in addition, a digital media item may be received, such as from another device, via a communication device. In this manner, digital media items can be received at a mobile device via its capture device or via download or other transmission from an external device.

At a step 608, the digital media items are assigned to individual groups. At a step 612, the digital media items are presented via a display in their assigned groups. As discussed above with respect to FIGS. 3A-3E, a digital media item may be assigned to a particular group based on one or more of its characteristics. In one embodiment for example, a digital media item may be assigned to a group based on the digital media items creation time.

A group may include various criteria used to allow the mobile device to assign digital media items properly. Each group may be associated with a period of time for example. In this manner, one or more digital media items may be assigned to a group if their creation time is within the group's associated period of time. As can be seen, matching a group's criteria to characteristic(s) of a digital media item defines which digital media items are assigned to the group.

At a decision step 616, the mobile device may detect or determine whether its sliding control or slider has been moved. If not, it is contemplated that the process may optionally return to step 604 where additional digital media items may be captured or received. If the slider has been moved at decision step 616, then the number of groups may be changed at step 620. Typically, the number of groups will be reduced if the slider is moved to indicate a coarse media grouping is desired by a user, while movement of the slider to indicate a fine media grouping increases the number of groups. As described above, the slider may be moved in a first direction to indicate a coarse media grouping is desired and in a second direction to indicate a fine media grouping is desired (with the first and second directions being opposite or distinct directions). As shown in FIGS. 3B-3E for instance the slider moves horizontally along a predefined path from left to right and vice versa.

In general, each group will have criteria to control what digital media items are assigned thereto (even after the number of groups has been increased or decreased). In this manner, the digital media items can be re-assigned to individual groups after the number of groups has changed, such as shown at step 624 of FIG. 6. As stated above, the criteria associated with each of the groups may be changed when the number of groups changes.

To illustrate with an example where creation time is the characteristic used to group digital media items, if the number of groups is increased their associated periods of time may be decreased. The digital media items are then re-assigned to the groups accordingly by including digital media items in groups where the creation time of the digital media items fall within the period of time criteria for a group.

At a step 628, the digital media items are presented within their individual assigned groups (as determined by the re-assignment step 624 above). Similar to step 612, the digital media items are presented via a display of the mobile device. The new presentation at step 628 reflects the change in the number of groups and re-assignment of digital media items.

In this manner, a user may quickly group digital media items according to particular characteristics simply by moving the slider provided by the mobile device. The user may then view, delete, modify, share, or otherwise interact with the digital media items. It is contemplated that all digital media items in a group may be shared with other users via a communication device of the mobile device. The user may select a group for sharing, such as via a touch or other input.

It is contemplated that the mobile device's processor(s) may be used to assign and re-assign the digital media items to groups as described with respect to steps 608 and 624. A processor may also control a display to present the digital media items in their assigned groups. In addition, a processor may be configured to determine or detect movement of the slider.

While various embodiments of the invention have been described, it will be apparent to those of ordinary skill in the art that many more embodiments and implementations are possible within the scope of this invention. In addition, the various features, elements, and embodiments described herein may be claimed or combined in any combination or arrangement.

What is claimed is:

1. A mobile device comprising:
   a data storage device;
   one or more cameras that capture a plurality of digital media items, each of the plurality of digital media items having one or more time-based characteristics and a media type, each digital media item to be stored on the data storage device;
   one or more buttons that indicate the start or stop of a media capture session when engaged;
   a sliding control that slides along a predefined path;
   a display that presents the sliding control, the one or more buttons, and one or more of the plurality of digital media items;
   the data storage device storing instructions that, when executed:
      during the media capture session record to a log on the data storage device all digital media items which are captured;
      start the media capture session when the one or more buttons indicating start is engaged and record in the log a starting time stamp;
      stop the media capture session when the one or more buttons indicating stop is engaged and record in the log an ending time stamp;
      group a subset of the digital media items into an initial grouping, the initial grouping comprising a plurality of groups, wherein, prior to grouping the subset into the initial grouping, the digital media items in the subset are first identified from the log and each group of the plurality of groups contains a distinct set of digital media items from the subset;
      in response to movement of the sliding control in a first direction along the predefined path, decrease the plurality of groups such that there are a fewer number of groups;
      in response to movement of the sliding control in a second direction along the predefined path, increase the plurality of groups such that there are more groups; and
      after the plurality of groups has been increased or decreased, assign each of the plurality of digital media items in the subset to one of the plurality of groups;
      store the plurality of groups on the data storage device; and
   a processor that executes the instructions;
   wherein after the plurality of groups has been increased or decreased, the display presents each of the plurality of digital media items in the subset in the one of the plurality of groups to which it has been assigned;
   wherein one or more digital media items within each of the plurality of groups are presented by the display physically arranged along a first axis and a distinct second axis;
   wherein the physical arrangement along the first axis is based on their media type and the physical arrangement along the distinct second axis is based on their one or more time-based characteristics.

2. The mobile device of claim 1, wherein a distinct period of time is associated with each of the plurality of groups.

3. The mobile device of claim 1, wherein the one or more time-based characteristics include a creation time.

4. The mobile device of claim 1 further comprising one or more communication devices, wherein the instructions, when executed by the processor, transmit one or more of the plurality of digital media items in one of the plurality of groups to a remote device.

5. The mobile device of claim 1, wherein the first axis is perpendicular to the distinct second axis.

6. A media management system comprising:
   a data storage device;
   a capture device that captures a plurality of digital media items, each having at least a first characteristic and a distinct second characteristic associated therewith, each digital media item to be stored on the data storage device;
   one or more buttons;
   a sliding control that slides along a predefined path, wherein movement of the sliding control in a first direction indicates a user selection of a coarse media grouping and movement of the sliding control in a second direction indicates a user selection of a fine media grouping;
   the data storage device storing instructions that, when executed:
      during a media capture session record to a log on the data storage device all digital media items which are captured;
      start the media capture session when the one or more buttons indicating start is engaged and record in the log a starting time stamp;
      stop the media capture session when the one or more buttons indicating stop is engaged and record in the log an ending time stamp;

group a subset of the digital media items into an initial grouping, the initial grouping comprising a plurality of distinct groups, wherein, prior to grouping the subset into the initial grouping, the digital media items in the subset are first identified from the log and each group of the plurality of distinct groups are associated with a distinct period of time;

increase the plurality of distinct groups such that there are an increased number of groups, and contract the period of time associated with each of the plurality of distinct groups in response to the user selection of the fine media grouping;

decrease the plurality of distinct groups such that there are a fewer number of groups, and expand the period of time associated with each of the plurality of distinct groups in response to the user selection of the coarse media grouping;

assign each of the digital media items in the subset to one of the plurality of distinct groups after the plurality of distinct groups is increased or decreased; and for each of the plurality of distinct groups, sort the plurality of digital media items therein based at least on the first characteristic and the distinct second characteristic;

store the plurality of groups on the data storage device;

a processor that executes the instructions; and a display that presents the sliding control and the plurality of digital media items, wherein each of the plurality of digital media items is presented within one of the plurality of distinct groups;

wherein, within each of the plurality of distinct groups, the plurality of digital media items are presented by the display physically arranged along a first axis and a distinct second axis;

wherein the physical arrangement of the plurality of digital media items along the first axis is based on the first characteristic associated therewith, and the physical arrangement of the plurality of digital media items along the distinct second axis is based on the distinct second characteristic associated therewith;

wherein the first characteristic is a time and the distinct second characteristic is a media type.

7. The media management system of claim 6 further comprising a communication device, wherein the instructions, when executed by the processor, transmit one or more of the plurality of digital media items within one of the plurality of distinct groups to a remote device.

8. The media management system of claim 6, wherein the first direction is left and the second direction is right.

9. The media management system of claim 6, wherein the predefined path of the sliding control is a linear horizontal path.

10. The media management system of claim 6, wherein the first axis is perpendicular to the distinct second axis.

11. A mobile-device implemented method of managing media comprising:

capturing a plurality of digital media items with a camera of the mobile device, each of the plurality of digital media items having at least a first characteristic and a distinct second characteristic associated therewith;

storing the plurality of digital media items on a memory or storage device;

during a media capture session record to a log on the memory or storage device all digital media items which are captured;

starting the media capture session when one or more buttons indicating start are engaged and record in the log a starting time stamp;

stopping the media capture session when the one or more buttons indicating stop are engaged and record in the log an ending time stamp;

assigning a subset of digital media items to a plurality of distinct groups, wherein prior to assigning the subset into the plurality of distinct groups, the digital media items in the subset are first identified from the log;

storing the plurality of distinct groups on the memory or storage device;

presenting a sliding control that is moveable along a predefined path with a display of the mobile device, wherein movement of the sliding control in a first direction indicates a user selection of a coarse media grouping and movement of the sliding control in a second direction indicates a user selection of a fine media grouping;

in response to receiving the user selection of the coarse media grouping, decreasing the plurality of distinct groups such that there are fewer groups;

in response to receiving the user selection of the fine media grouping, increasing the plurality of distinct groups such that there are more groups;

after increasing or decreasing the plurality of distinct groups, re-assigning the plurality of digital media items in the subset to the plurality of distinct groups, wherein each of the plurality of distinct groups contains a distinct subset of the plurality of digital media items; and both after assigning and re-assigning the plurality of digital media items to the plurality of distinct groups, presenting the plurality of digital media items in the subset in the plurality of distinct groups with a display screen of the mobile device;

wherein, within each of the plurality of distinct groups, the plurality of digital media items are presented by the display physically arranged along a first axis and a distinct second axis;

wherein the physical arrangement of the plurality of digital media items along the first axis is based on the first characteristic associated therewith, and the physical arrangement of the plurality of digital media items along the distinct second axis is based on the distinct second characteristic associated therewith;

wherein the first characteristic is a time and the distinct second characteristic is a media type.

12. The method of claim 11 further comprising transmitting all digital media items in a user selected one of the plurality of distinct groups to a remote device via a communication device of the mobile device.

13. The method of claim 11, wherein the first axis is perpendicular to the distinct second axis.

* * * * *